(12) United States Patent
Yu et al.

(10) Patent No.: US 10,928,714 B2
(45) Date of Patent: Feb. 23, 2021

(54) LENS SEALING SLEEVE, LENS MODULE, LENS ADJUSTMENT MODULE, AND PROJECTION DEVICE

(71) Applicant: APPOTRONICS CORPORATION LIMITED, Guangdong (CN)

(72) Inventors: Guangjun Yu, Shenzhen (CN); Siyao Huang, Shenzhen (CN); Yi Li, Shenzhen (CN)

(73) Assignee: Appotronics Corporation Limited, Guangdong (CN)

( * ) Notice: Subject to any disclaimer, the term of this patent is extended or adjusted under 35 U.S.C. 154(b) by 0 days.

(21) Appl. No.: 16/461,340

(22) PCT Filed: Nov. 3, 2017

(86) PCT No.: PCT/CN2017/109346
§ 371 (c)(1),
(2) Date: May 15, 2019

(87) PCT Pub. No.: WO2018/090845
PCT Pub. Date: May 24, 2018

(65) Prior Publication Data
US 2020/0057240 A1 Feb. 20, 2020

(30) Foreign Application Priority Data
Nov. 15, 2016 (CN) .......................... 2016 1 1005624

(51) Int. Cl.
*G03B 21/14* (2006.01)
*G02B 7/02* (2021.01)
*G03B 17/12* (2021.01)

(52) U.S. Cl.
CPC ........... *G03B 21/145* (2013.01); *G02B 7/023* (2013.01); *G03B 17/12* (2013.01); *G03B 21/142* (2013.01)

(58) Field of Classification Search
CPC .......... G02B 7/02; G02B 7/023; G02B 7/026; G03B 17/12; G03B 21/14; G03B 21/142; G03B 21/145
See application file for complete search history.

(56) References Cited

U.S. PATENT DOCUMENTS 5,250,968 A * 10/1993 Numata ............... H04N 5/7408
348/E5.138
5,537,167 A * 7/1996 Toide ...................... H04N 9/31
348/825

(Continued)

FOREIGN PATENT DOCUMENTS

CN 103080832 A1 5/2013
CN 104735311 A 6/2015

(Continued)

OTHER PUBLICATIONS

Nikon PB-4 User Manual.*

(Continued)

*Primary Examiner* — Bao-Luan Q Le
(74) *Attorney, Agent, or Firm* — Knobbe, Martens, Olson & Bear, LLP

(57) ABSTRACT

A lens sealing sleeve includes a hollow cylindrical sleeve body used for a lens barrel to pass through and including a plurality of fold portions arranged along the axial direction, and two ends of the sleeve body are provided with a first opening and a second opening. The lens sealing sleeve also includes a first connection portion and a second connection portion. The first connection portion includes a first protrusion at least partially surrounding the first opening and correspondingly extending in a direction facing away from a central line of the first opening. The second connection portion includes a second protrusion at least partially surrounding the second opening and correspondingly extending in a direction facing away from a central line of the second (Continued)

opening. The first protrusion is provided with a first connection hole. The second protrusion is respectively provided with a second connection hole.

20 Claims, 10 Drawing Sheets

(56) References Cited

U.S. PATENT DOCUMENTS

| | | | | |
|---|---|---|---|---|
| 6,416,184 B1* | 7/2002 | Arai | ............ | G03B 21/16 349/5 |
| 6,871,962 B2* | 3/2005 | Kane | ............ | G03B 21/145 277/644 |
| 6,967,784 B2* | 11/2005 | Ichino | ............ | G02B 7/021 359/694 |
| 7,045,936 B2* | 5/2006 | Baker | ............ | H04N 9/3141 313/35 |
| 8,678,678 B2* | 3/2014 | Imura | ............ | G03B 17/561 396/419 |
| 2003/0169333 A1 | 9/2003 | Yazawa et al. | | |
| 2004/0150891 A1* | 8/2004 | Ichino | ............ | G02B 7/04 359/704 |
| 2004/0160580 A1* | 8/2004 | Baker | ............ | H04N 9/3141 353/100 |
| 2013/0022347 A1* | 1/2013 | Imura | ............ | G03B 17/565 396/530 |
| 2014/0313492 A1 | 10/2014 | Matsui et al. | | |

FOREIGN PATENT DOCUMENTS

| | | |
|---|---|---|
| CN | 206440870 U | 8/2017 |
| DE | 1121456 | 1/1962 |
| JP | 2000-131585 A | 5/2000 |

OTHER PUBLICATIONS

International Search Report of corresponding PCT Patent Application No. PCT/CN2017/109346—2 pages (dated Feb. 9, 2018).
Partial Supplementary European Search Report issued in application No. 17872281.5 dated Sep. 22, 2020.
Extended European Search Report issued in application No. 17872281.5 dated Dec. 4, 2020.

* cited by examiner

120
LENS SEALING SLEEVE, LENS MODULE, LENS ADJUSTMENT MODULE, AND PROJECTION DEVICE

CROSS-REFERENCE TO RELATED APPLICATIONS

The present application is a national phase application of International Application No. PCT/CN2017/109346 filed on Nov. 3, 2017, which claims priority to Chinese Patent Application No. 201611005624.8, filed on Nov. 15, 2016, the contents of each of which are incorporated herein by reference in its entirety and made a part of this specification.

TECHNICAL FIELD

The present disclosure relates to the field of optical technologies, and in particular, to a lens sealing sleeve, a lens module, a lens adjustment module, and a projection apparatus.

BACKGROUND

As a type of projector in a projection apparatus, based on the imaging principle of the projector, there should be very little foreign matter, including dust, powder, water vapor, micro particles, etc., in the working environment of the projector, otherwise, optical components will be contaminated, which will adversely affect the brightness and image quality of the projector, thereby making the projection effect of the projector poor. Moreover, foreign matter can also cause the temperature of internal electronic components to rise, causing malfunctions and even causing the projector to burn out. Therefore, anti-foreign matter for the projector is directly related to the projection quality and service life of the projector.

SUMMARY

Technical Problem

The main structure of the lens of the existing projector includes a lens barrel, and a lens group is arranged in the lens barrel. A light incidence lens is disposed on a side of the lens barrel receiving light, and a light emitting lens is disposed on a side of the barrel emitting light. The lens barrel is generally supported by a support component such as a seat in the projector. If the lens barrel located between the light incidence lens and the light emitting lens is not provided with an anti-foreign matter measure, it is easy to cause foreign matter to adhere to the light incidence lens and even pervade in the space on a side of a lens surface of the light incidence lens for receiving light, via the space where the lens barrel is located or/and the space between the lens barrel and the support component. The foreign matter adhered to the light incidence lens will block a certain light beam from entering the lens, and the foreign matter pervading in the above space will, for example, diffuse the light beam that is incident on the light incidence lens, all of which will adversely affect the normal transmission of the light beam, thereby causing a drop in the quality of the projected image. In addition, the lens in the existing projector may be in a poor working position, so a lens adjustment module for adjusting the lens position is provided in the existing projector, and then the condition of the lens receiving light beam can be improved, and it is achieved that the lens is in a working position at which the definition of the image projected onto the screen by the lens is relatively optimal. In this case, since the lens adjustment module needs to occupy a certain space, and since a certain gap needs to be reserved for the displacement of the lens, foreign matter easily enters from the above space and the gap so as to adversely affect the lens receiving light beam.

Therefore, in view of the deficiencies in the related art, it is urgent to propose a technical solution in which a lens sealing sleeve that can achieve good anti-foreign matter for the lens, especially the lens barrel, is provided, and a lens module, a lens adjustment module, and a projection apparatus that are provided with the lens sealing sleeve to obtain good anti-foreign matter performance are provided.

Solution to the Problem

Technical Solutions

In view of the above, the present disclosure provides a lens sealing sleeve and a lens device, a lens adjustment module and a projection apparatus that are provided with the lens sealing sleeve, so as to solve the technical problems in the related art, including lacking anti-foreign matter measures for the lens barrel of the lens, the lens unable to receive the light beam well, and reduction of the quality of the emitted light of the lens.

To achieve one object above, the present disclosure provides the following technical solution: a lens sealing sleeve, including: a hollow cylindrical sleeve body, the sleeve body being used for a lens barrel to pass through and including a plurality of fold portions arranged along an axial direction, two ends of the sleeve body being provided with a first opening and a second opening. The lens sealing sleeve further includes a first connection portion and a second connection portion. The first connection portion includes a first protrusion and a second connection portion includes a second protrusion. The first protrusion at least partially surrounds the first opening and correspondingly extends in a direction facing away from a center line of the first opening. The second protrusion at least partially surrounds the second opening and correspondingly extends in a direction facing away from a center line of the second opening. A first connection hole being disposed on the first protrusion and a second connection hole being disposed on the second protrusion.

Further, the first protrusion includes a ring tab integrally surrounding the first opening, and a plurality of first connection holes is evenly provided on the ring tab.

Further, the second protrusion includes a protruding plate integrally surrounding the second opening, a plurality of second connection holes being provided on the protruding plate, at least one circle of protruding rib being provided on a first side surface of the protruding plate backing to the sleeve body.

Further, the protruding rib includes two circles of first protruding rib provided at an outer edge of the first side surface and a circle of second protruding rib that is closer to the second opening than the first protruding rib.

Still further, each circle of the first protruding rib includes a pair of first straight segments opposite to each other and a pair of curved segments that are opposite to each other and distancing away from a center of the second opening in a radial direction of the second opening, the second protruding rib including a pair of second straight segments that are opposite to each other and respectively parallel to the first straight segments and a pair of head-shoulder segments opposite to each other, a pair of head segments of the pair of head-shoulder segments being close to an outer circumference of the second opening.

Even further, at least one circle of convex edge is provided at an edge of a second side surface of the protruding plate facing the sleeve body.

To achieve another object above, the present disclosure provides a lens module, and the lens module includes: a first seat, a second seat, a plurality of connection members, and the lens sealing sleeve described above. The first seat is provided with a third connection hole corresponding to the first connection hole. The second seat is provided with a fourth connection hole corresponding to the second connection hole. The plurality of connection members connects the corresponding first and third connection holes so as to connect the first protrusion with the first seat and connects the corresponding second and fourth connection holes so as to connect the second protrusion with the second seat, and the sleeve body separates space between the first seat and the second seat from an interior of the sleeve body.

To achieve still another object above, the present disclosure provides a lens adjustment module, and the lens adjustment module includes: a base mechanism and a second adjustment mechanism arranged opposite to each other, the base mechanism including a base body, the second adjustment mechanism including a second slider, a substantially central region of the base body being provided with a first communication hole and a substantially central region of the second slider being provided with a third communication hole, the second slider being for fixed connection with the lens barrel, the second slider being movable relative to the base body. The lens adjustment module further includes a lens sealing sleeve, the lens sealing sleeve including a hollow cylindrical sleeve body, a first connection portion and a second connection portion, the sleeve body including a plurality of fold portions arranged along an axial direction thereof, a first opening and a second opening being provided at two ends of the sleeve body, the first connection portion comprising a first protrusion and a second connection portion comprising a second protrusion, the first protrusion at least partially surrounding the first opening and correspondingly extending in a direction facing away from a center line of the first opening, the second protrusion at least partially surrounding the second opening and correspondingly extending in a direction facing away from a center line of the second opening, and a first connection hole being disposed on the first protrusion and a second connection hole being disposed on the second protrusion. The lens adjustment module further includes a plurality of sleeve connection members, a third connection hole that corresponds to the first connection hole being provided on a side of the second slider facing the base body, a fourth connection hole that corresponds to the second connection hole being provided on a side of the base body facing away from the second slider, the plurality of sleeve connection members connecting the corresponding first and third connection holes so as to connect the first connection portion with the second slider, the plurality of sleeve connection members connecting the corresponding second and fourth connection holes so as to connect the second connection portions with the base body, the third communication hole and the sleeve body passing through the first communication hole being used for passage of the lens barrel.

Further, a first adjustment mechanism is further provided between the base mechanism and the second adjustment mechanism, the base mechanism, the first adjustment mechanism and the second adjustment mechanism being sequentially stacked and connected, the first adjustment mechanism including a first slider, a substantially central region of the first slider being provided with a second communication hole, the first slider being movably connected to the base body, the second slider being movably connected the first slider, the sleeve body also passing through the second communication hole, the sleeve body and the third communication hole being used for passage of the lens barrel.

Further, the first protrusion includes a ring tab integrally surrounding the first opening, a plurality of first connection holes being evenly provided on the ring tab, the third connection hole corresponding to the first connection hole being provided on an annular surface on a side of the second slider facing the first slider.

Further, the second protrusion includes a protruding plate integrally surrounding the second opening, a plurality of second connection holes being provided on the protruding plate, a first side surface of the protruding plate facing away from the sleeve body being provided with at least one circle of protruding rib. The lens adjustment module further includes a lens adapter, the lens adapter being connected to the base body, the lens adapter comprising a shelf, a shelf side portion of the shelf facing the base body and abutting against the protruding rib.

Further, the lens adapter includes a receiving cavity that is formed by the shelf and extends in a direction facing away from the base body, the lens barrel being partially received in the receiving cavity, a light transmission portion for a light beam to enter the lens being provided on the receiving cavity, the protruding rib being configured to seal the receiving cavity.

Still further, the shelf side portion includes a flange and a racking surface, a recess being provided on a base body surface of the base body facing the shelf, at least one circle of convex edge being provided at an edge of a second side surface of the protruding plate facing the sleeve body, the flange abutting against the base body surface, the convex edge being inserted into and connected to the recess, the protruding rib including two circles of first protruding rib provided at an outer edge of the first side surface and one circle of second protruding rib that is closer to the second opening than the first protruding rib, both the first protruding rib and the second protruding rib abutting against the racking surface.

Still further, each circle of the first protruding rib includes a pair of first straight segments opposite to each other and a pair of curved segments that are opposite to each other and distancing away from a center of the second opening in a radial direction of the second opening, the second protruding rib including a pair of second straight segments that are opposite to each other and respectively parallel to the first straight segments and a pair of head-shoulder segments opposite to each other, a pair of head segments of the pair of head-shoulder segments being close to an outer circumference of the second opening, the second protruding rib being close to a cavity surface of the receiving cavity.

To achieve still another object above, the present disclosure provides a projection apparatus, and the projection apparatus includes a lens, a light machine, and the lens adjustment module described above, the lens being fixedly connected to the second slider, the lens barrel of the lens passing through the lens sealing sleeve, the lens adapter being respectively connected to the base body and the light machine, the lens adapter being provided with a light transmission portion for a light beam generated by the light machine to transmit and enter the lens.

Beneficial Effect of the Present Disclosure

Beneficial Effect

Compared with the related art, the technical solution provided by the present disclosure has the following advantages.

In one aspect, the lens sealing sleeve provided by the present disclosure can provide anti-foreign matter measures for a lens, especially a lens barrel, thereby achieving that the light incidence lens of the lens works well substantially without being contaminated by the foreign matter so that the projected image of the lens has excellent quality.

In another aspect, the lens adjustment module provided by the present disclosure adopts a base mechanism, a first adjustment mechanism and a second adjustment mechanism that are arranged in a stacked manner. In the case where the position of the lens can be adjusted, the lens sealing sleeve can provide a good seal for the gap for the lens displacement, and also provide a good seal between the base mechanism and the lens adapter. Therefore, the light incidence lens can work well, so that the lens can receive the light beam well and emit a high quality projection image.

BRIEF DESCRIPTION OF DRAWINGS

In order to more clearly illustrate the embodiments of the present disclosure or the technical solutions in the related art, accompany drawings used in the description of the embodiments or the related art will be briefly described below. Obviously, the accompany drawings in the following description are only some embodiments of the present disclosure, and other drawings can be obtained from these drawings by those skilled in the art without any creative work.

DESCRIPTION OF THE REFERENCE SIGNS

1000—lens adjustment module; 100—base mechanism; 110—base body; 110A—base body surface; 111—first protrusion; 112—first opening; 113—first communication hole; 114—fourth connection hole; 115—recess; 120—first boss; 121—threaded fixing hole; 130—support seat; 131—slot; 132—shaft sleeve; 133—cover plate;

200—first adjustment mechanism; 210—first slider; 211—first protruding portion; 212—first through slot; 213—through hole; 214—second protrusion; 215—second opening; 216—second communication hole; 220—first sliding bar; 221—breach; 222—curved surface; 223—crimping surface; 224—penetrating hole; 230—second boss; 231—threaded fixing hole; 240—first transmission block; 250—first sliding sleeve; 260—first photoelectric sensor;

300—second adjustment mechanism; 310—second slider; 311—second protruding portion; 312—second through slot; 313—second transmission block; 314—rib plate; 314A—position-limiting bump; 315—opening; 316—pick; 317—snap hook; 318—third communication hole; 319—third connection hole; 320—second sliding bar; 321—breach; 322—curved surface; 323—crimping surface; 324—penetrating hole; 330—second sliding sleeve; 340—second photoelectric sensor; 350—annular surface; 360—spacer;

400—first driving mechanism; 410—first motor; 420—first screw rod; 430—first fixing tab; 431—first sub-fixing tab;

500—second driving mechanism; 510—second motor; 520—second screw rod; 530—second fixing tab; 531—second sub-fixing tab;

600—lens adapter; 610—shelf; 611—shelf side-portion; 611A—flange; 611B—racking surface; 620—receiving cavity; 621—light transmission portion; 622—cavity surface;

700—lens sealing sleeve; 710—sleeve body; 711—fold portion; 712—first opening; 713—second opening; 720—first connection portion; 721—first protrusion; 722—first connection hole; 723—first sector tab; 724—second sector tab; 730—second connection portion; 731—second protrusion; 732—second connection hole; 733—protruding plate; 734—first protruding rib; 735—second protruding rib, 735A—head-shoulder segment; 735A1—head segment; 735A2—shoulder segment; 736—protruding edge;

SF—threaded fixing member; CT—oil-free bushing; JT—lens; TT—lens barrel; CM—axial sealing structure; TL—sleeve connection member; IR—light incidence space; IL—light incidence lens.

DESCRIPTION OF EMBODIMENTS

In order to make the objects, technical solutions and advantages of the present disclosure more comprehensible, the present disclosure will be further described in detail below with reference to FIGS. 1-18 and the embodiments. It is to be understood that the embodiments described below are merely illustrative of the present disclosure and are not intended to limit the present disclosure.

Embodiment of a Lens Sealing Sleeve

Figure 1:
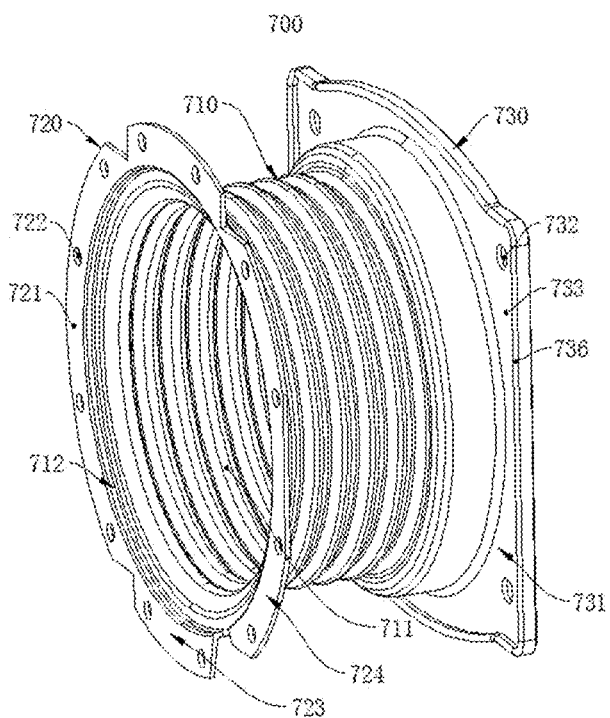
FIGS. 1 and 2 are schematic structural diagrams of a lens sealing sleeve according to an embodiment of the present disclosure when viewed from two different perspectives.
Figure 2:
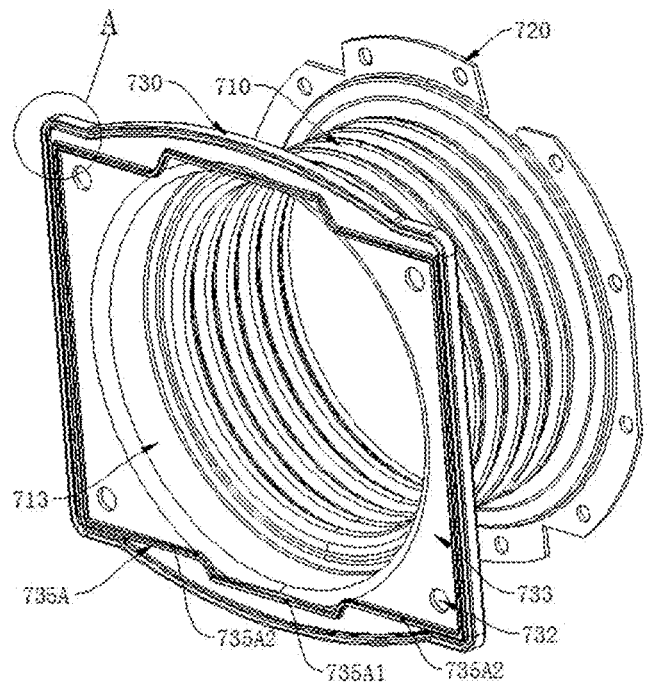
Figure 3:
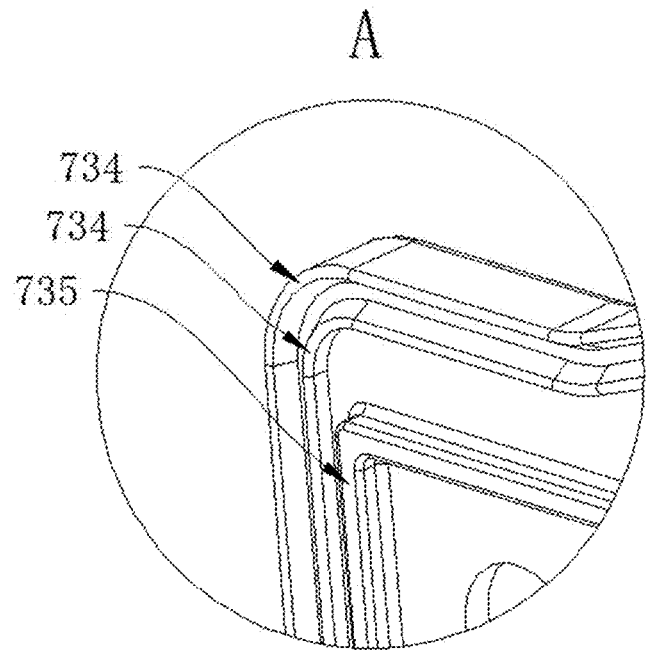
FIG. 3 is a partial enlarged diagram of a position A in FIG. 2.

As an object of the present disclosure, the embodiment of the lens sealing sleeve provided by the present disclosure is described in detail below. Referring to FIG. 1 to FIG. 3 for details, the lens sealing sleeve 700 includes a hollow cylindrical sleeve body 710 that is sleeved on the outer circumference of the lens barrel (referring to FIG. 11 for details, and it will be described in more detail below) of the lens JT and used for the lens barrel to pass through. It should be understood that, in general, the main structure of the lens JT generally includes one cylindrical lens barrel in which a lens group is provided. Furthermore, a light incidence lens is arranged on a side of the lens barrel receiving light and a light emitting lens is arranged on a side of the lens barrel emitting light. The above sleeve body 710 includes a plurality of fold portions 711 arranged along an axial direction thereof. It is understood that the fold portion 711 is preferably sleeved on the outer circumference of the lens barrel and in close contact with the lens barrel elastically. Preferably, the sleeve body 710 is made of an elastic material such as silica gel, rubber and so on. By providing the fold portion 711, not only an elastic deformation amount of the sleeve body 710 is increased, but also the tightening force of the fold portion 711 in close contact with the outer circumference of the lens barrel can be enhanced. Although an axial sealing structure is usually provided at a side of the lens barrel close to the light emitting lens, through the close contact of the fold portion 711 with the outer circumference of the lens barrel, it is possible to further prevent foreign matter from entering, along the axial direction of the sleeve body 710 via the gap between the fold portion 711 and the lens barrel, into a light incidence space IR where a free end side of the lens barrel receiving light is located, that is, the light incidence space at which a side of the light incidence lens IL receiving light is located, which facilitates keeping the light incidence space IR sealed with respect to the outside space of the light incidence space IR. It should be noted that the foreign matter described in the present specification includes dust, powder, moisture, micro particles, and the like. The sleeve body 710 is provided with a first opening 712 and a second opening 713 at both ends thereof and apertures of the first opening 712 and the second opening 713 are provided to adapt to the lens barrel. The lens sealing sleeve 700 further includes a first connection portion 720 and a second connection portion 730. The first connection portion 720 includes a first protrusion 721 and the second connection portion 730 includes a second protrusion 731, the first protrusion 721 at least partially surrounds the first opening 712 while correspondingly extending in a direction facing away from the first opening, and the second connection portion 730 at least partially surround the second opening 713 while correspondingly extending in a direction facing away from the second opening. Preferably, the first protrusion 721 and the second protrusion 731 respectively extend in a radial direction parallel to the sleeve body 710, i.e., in a case where only the first protrusion 721 extending from a part of the outer circumference of the first opening 712 in a direction facing away from the first opening and the second protrusion 731 extending from a part of the outer circumference of the second opening 713 in a direction facing away from the second opening are provided such that these protrusions function to fix the first connection portion 720 and the second connection portion 730 and seal the corresponding part of the outer circumferences of the first opening 712 and the second opening 713, the other part of the outer circumference of the first opening 712 and the second opening 713 can be sealed by providing a seal such as a sponge. However, it is preferable that the first protrusion 721 and the second protrusion 731 are both arranged to integrally surround the first opening 712 and the second opening 713, i.e., the first protrusion 721 and the first opening 712, the second protrusion 731 and the second opening 713 are substantially flared. In this case, the structure of the first protrusion 721 and the second protrusion 731 is simple and good sealing and fixing can be achieved. In addition, it should be noted that the first protrusion and the second protrusion extending in a direction facing away from the first opening and the second opening can be construed as that the extending direction of the first protrusion is at an angle with the center line of the first opening and the extending direction of the second protrusion is at an angle with the center line of the second opening. In order to stably and hermetically fix the first protrusion and the second protrusion, the above-mentioned angle is preferably a right angle, i.e., in such a case, the first protrusion and the second protrusion respectively extend in a radial direction parallel to the sleeve body. In addition, in order to increase the reliability of the lens sealing sleeve, a connection reinforcing portion can be respectively provided between the fold portion and the first protrusion and between the fold portion and the second protrusion. The connection reinforcing portion is made of a material whose fatigue resistance is stronger than that of the fold portion. A first connection hole 722 is provided on the first protrusion 721 and a second connection hole 732 is provided on the second protrusion 731, and the first connection hole 722 and the second connection hole 723 are used for cooperating with the respective sleeve connection members to fix the lens sealing sleeve 700, and the sleeve connection member may adopt a screw, a stud or the like. Preferably, the lens sealing sleeve 700 is integrally formed by an elastic material such as silica gel, rubber and so on, so that the manufacturing process is simple and the cost is saved. As described above, when the lens sealing sleeve 700 is sleeved on the outer circumference of the lens barrel, the lens sealing sleeve 700 can prevent foreign matter from directly entering into the light incidence space via the outer circumference of the lens barrel, thereby reducing or eliminating the presence of foreign matter in the light incidence space, and avoiding the adverse effects of foreign matter on lens receiving light beam.

As a specific implementation of the first protrusion 721, the first protrusion 721 includes a ring tab integrally surrounding the first opening 712, and a plurality of first connection holes 722 are evenly provided on the ring tab. The ring tab is preferably a circular ring tab, and the center of the ring tab substantially coincides with the center of the first opening 712. The plurality of first connection holes 722 are evenly provided on the ring tab, which can provide a uniform force when the first protrusions 721 are fixed by the plurality of sleeve connection members that pass through the respective first connection holes 722 and achieves that the first opening 712 is strictly sealed in the radial direction thereof. Further, referring to FIGS. 1 and 2, the first protrusion 721 includes a plurality of sector tabs arranged along the outer circumference of the first opening 712 and spaced apart from each other. The plurality of sector tabs is integrally approximated to the above ring tab and integrally surrounds the first opening 712. At least one first connection hole 722 is provided on each of the sector tabs, and the gap between the adjacent sector tabs can provide a certain amount of deformation in the radial direction of the first opening 712 for each sector tab, which can reduce the processing precision of the first protrusion 721 and save cost. More specifically, in the present embodiment, the plurality of sector tabs are provided to include first sector tabs 723 each having two oppositely provided first connection holes 722 and two oppositely provided second sector tabs 724 each having four first connection holes 722, and the respective first connection holes 722 are symmetrically provided with the center of the first opening 712 as a center. In this way, positioning of the first protrusion 721 when being fixed can be facilitated depending on the difference in shapes of the first sector tab 723 and the second sector tab 724.

As a specific embodiment of the second protrusion 731, the second protrusion 731 includes a protruding plate 733 integrally surrounding the second opening 713. A plurality of second connection holes 732 are provided on the protruding plate 733 and the respective second connection holes 732 are preferably evenly distributed on the protruding plate 733. A first side surface of the protruding plate 733 facing away from the sleeve body 710 is provided with at least one circle of protruding rib. It can be known that the above-mentioned protruding rib extends in a direction facing away from the sleeve body 710. In this way, when the second protrusion 731 is fixed by the plurality of sleeve connection members that are passing through the respective first connection holes 722, the at least one circle of protruding rib can abut against a surface of the other member in contact with the second protrusion 731 to seal a gap between the second protrusion 731 and this surface.

Referring to FIGS. 2 and 3, preferably, the protruding rib includes two circles of the first protruding ribs 734 provided at an outer edge of the first side surface. Preferably, the two circles of the first protruding ribs 734 are equally spaced. The protruding rib further includes one circle of a second protruding rib 735 that is closer to the second opening 713 than the first protruding rib 734. Preferably, the second protruding rib 735 is spaced apart from the first protruding rib 734 closest thereto by a variable interval, so that after the second protrusion 731 is fixed, the two circles of the first protruding ribs 734 provide one sealing function and the second protruding rib 735 provides another sealing function in the radial direction of the second opening 713 with respect to the foreign matter outside the lens sealing sleeve 700, thereby making it possible to prevent the foreign matter from entering into the second opening 713. In addition, if the shapes of the first protruding rib 734 and the second protruding rib 735 are different, space of different sizes can be formed between the first protruding rib 734 and the second protruding rib 735, such that different airtight resistances can be produced for the foreign matter entering into the space, thereby slowing the movement of the foreign matter. In addition, the number of the circles of the protruding ribs can also be set according to actual needs.

Referring to FIG. 2, further, each circle of the first protruding rib 734 includes a pair of first straight segments (unmarked) opposite to each other and a pair of curved segments (unmarked) that are opposite to each other and distancing away from a center of the second opening 713 in the radial direction of the second opening 713. The second protruding rib 735 includes a pair of second straight segments (unmarked) that are opposite to each other and respectively parallel to the first straight segments, and a pair of head-shoulder segments 735A opposite to each other. Each head-shoulder segment 735A includes two shoulder segments 735A2 and one head segment 735A1 therebetween. A pair of head segments 735A1 of the pair of head-shoulder segments 735A are close to the outer circumference of the second opening 713, and the pair of head segments 735A1 are preferably tangent to the outer circumference of the second opening 713. By providing the straight segment, the curved segment and the head-shoulder segment 735A above, the irregularities of the shapes of the first protruding rib 734 and the second protruding rib 735 are improved, and the sealing performance thereof can be increased; further, by approaching of the pair of head segments 735A1 to the outer circumference of the second opening 713, the pair of head segments 735A1 can provide another sealing function described above at a position closer to the outer circumference of the second opening 713, which helps to improve the sealing performance.

Referring to FIG. 1, still further, at least one circle of protruding edge 736 is provided at an edge of the second side surface of the sleeve body 710 facing the protruding plate 733. For example, the one circle of protruding edge 736 can be matched with a circle of recess. Therefore, the one circle of protruding edge 736 can further improve the sealing performance of the lens sealing sleeve 700 and improve the stability when the second protrusion 731 is fixed.

Embodiment of a Lens Module

As another object of the present disclosure, an embodiment of the lens module provided by the present disclosure will be described in detail below. A lens module (not shown) is generally used in a projection apparatus such as a projector to support and fix a lens, so the present disclosure adopts measures against foreign matter for the lens fixed to the lens module, especially for the lens barrel. Specifically, the lens module includes a first seat, a second seat, a plurality of sleeve connection members, and a lens sealing sleeve in any embodiment of the lens sealing sleeve above. Structures and advantages of the lens sealing sleeve can be referred to the content above and will not be described again. Accordingly, the lens module also has the advantages brought by the advantages of the lens sealing sleeve. A third connection hole corresponding to the first connection hole is provided on the first seat, and a fourth connection hole corresponding to the second connection hole is provided on the second seat. The plurality of sleeve connection members connect the corresponding first and third connection holes so as to connect the first protrusion with the first seat, and connect the corresponding second and fourth connection holes so as to connect the second protrusion with the second seat. The plurality of sleeve connection member may be screws, studs or the like. In the embodiment of the lens module, the relative position of the first seat and the second seat is fixed, i.e., the position of the lens is not adjustable. As described above, the lens sealing sleeve is provided between the first seat and the second seat by the cooperation of the sleeve connection member and the corresponding connection hole, so that when the lens is supported and fixed by the first seat or/and the second seat and the lens barrel passes through the lens sealing sleeve, the lens barrel located between the first seat and the second seat is sealed by the lens sealing sleeve. Therefore, the foreign matter existing in the space between the first seat and the second seat neither adheres to the outer circumference of the lens barrel nor moves along the outer circumference of the lens barrel to the light incidence lens. Preferably, the structure of the second seat is provided in such a manner that a sealed light incidence space can be formed between the second seat and the light incidence lens of the lens barrel. Alternatively, a third seat opposite to and connected to the second seat is provided, and the second protrusion is snapped between the second seat and the third seat. Moreover, there is sealed light incidence space between the light incidence lens of the lens barrel and the third seat, so that the lens sealing sleeve can prevent foreign matter from entering the light incidence space and the light incidence space will not be contaminated by foreign matter, and the lens can receive the light beam well.

Embodiment of a Lens Adjustment Module

As another object of the present disclosure, an embodiment of the lens adjustment module provided by the present disclosure will be described in detail below. The main difference between the lens adjustment module and the lens module lies in that the lens adjustment module can perform position-adjustment on the lens mounted thereon. It should be noted that, in one another embodiment, the lens adjustment module includes a base mechanism and a second adjustment mechanism arranged opposite to each other. The second adjustment mechanism can be driven, by a driving mechanism of a manual device such as a threaded adjustment lever mechanism or an electric device such as one in which a motor and a gear cooperate, to move relative to the base body, thereby causing a position change of the lens fixedly connected to the second adjustment mechanism. The lens sealing sleeve in each of the lens sealing sleeve embodiments is provided between the base mechanism and the second adjustment mechanism to function to prevent the foreign matter entering the space between the base mechanism and the second adjustment mechanism. Hereinafter, in the embodiment, the lens adjustment module including a base mechanism, a first adjustment mechanism, and a second adjustment mechanism is taken as an example for detailed description, and reference can be made to the lens adjustment module in the other embodiments described above for understanding and adaptability improvement, in summary, they all utilize the respective advantages of the lens sealing sleeve 700 provided by the present disclosure to improve the anti-foreign matter performance of the lens adjustment module and improve the quality of the emitted light of the lens. Specifically, referring to FIGS. 1 to 3 and referring to FIGS. 4 to 18, the lens adjustment module 1000 includes a base mechanism 100, and a first adjustment mechanism 200 and a second adjustment mechanism 300 that are sequentially stacked and connected from the near to the distant with respect to the base mechanism 100 in the transmission direction of the light beam incident on the lens JT. The base mechanism 100 includes a base body 110 and the first adjustment mechanism 200 includes a first slider 210. The second adjustment mechanism 300 includes a second slider 310 fixedly connected to the lens. For example, a corresponding snap-connection structure may be provided on the second slider and the lens barrel TT of the lens to achieve a fixed connection between the two. The substantially central regions of the base mechanism 100, the first adjustment mechanism 200 and the second adjustment mechanism 300 are all provided with a first communication hole 113, a second communication hole 216 and a third communication hole 318 that are for the passage of the lens barrel TT of the lens JT. Each of the communication holes is substantially concentric. The first connection portion 710 of the lens sealing sleeve 700 is fixed on the base body 110, and the second connection portion 730 of the lens sealing sleeve 700 is fixed on the second slider 310, i.e., the lens barrel TT of the lens JT passing through the first communication hole 113 passes through the second communication hole 216 and the third communication hole 318 by passing the lens sealing sleeve 700 (to be described in detail later). As a specific embodiment in which the first slider 210 and the base body 110 are movably connected and the second slider 310 and the first slider 210 are movably connected, the lens adjustment module 1000 further includes a first electric driving mechanism 400 and a second electric driving mechanism 500. The first electric driving mechanism 400 includes a first motor 410 and a first screw rod 420 that are connected in a transmission way, for example, using a coupling. The second electric driving mechanism 500 includes a second motor 510 and a second screw rod 520 that are connected in a transmission way, for example, using a coupling. The first screw rod 420 is connected to the first slider 210 in a transmission way, and the second screw rod 520 is connected to the second slider 310 in a transmission way. It can be seen that the connection in a transmission way may be a thread driving connection, i.e., threaded portions of the first screw rod 420 match the threaded portions on the first slider 210 and threaded portions of the second screw rod 520 match the threaded portions on the second slider 310, and the threaded portions may be formed directly on the self-blocks of the first slider 210 and the second slider 310 or arranged on a transmission components that are respectively fixed at the first slider 210 and the second slider 310. In addition, the screw rod used above may also be replaced by a lead screw. The first screw rod 420 rotates by being driven by the first motor 410 and causes the first slider 210 to move along the axis direction of each corresponding screw rod through the thread driving connection, and the second screw rod 520 rotates by being driven by the second motor 510 and causes the second slider 310 to move along the axis direction of each corresponding screw rod through the thread driving connection. That is, the first motor 410 is connected to the first slider 210 in a transmission way and drives the first adjustment mechanism 200 so as to drive the second adjustment mechanism 300 and drive the lens JT to move in a first direction. The second motor 510 is connected to the second slider 310 in a transmission way and drives the second adjustment mechanism 300 so as to cause the second adjustment mechanism 300 to drive the lens JT to move in a second direction perpendicular to the first direction. For ease of understanding, the first direction includes both Y− and Y+ directions, and the second direction includes both X− and X+ directions, as indicated by the arrows of the coordinate axes in FIG. 4. The first motor 410 and the second motor 510 may be fixedly connected to one of the base body 110 and the first slider 210 at the same time or fixedly connected to the base body 110 and the first slider 210 respectively. It can be understood from the above stacking and connection arrangement that since the second adjustment mechanism 300 is movably connected to the first adjustment mechanism 200 in a relatively movable manner, the first electric driving mechanism 400 drives the first adjustment mechanism 200 to move relative to the base mechanism 100 in the first direction and drives the second adjustment mechanism 300 to move along with it so as to indirectly achieve position-adjustment, in the first direction, on the lens JT fixed to the second slider 310. The second electric driving mechanism 500 drives the second adjustment mechanism 300 to move in the second direction relative to the base mechanism 100 so as to directly achieve position-adjustment, in the second direction, on the lens JT fixed on the second slider 310. Therefore, the position-adjustment, in the first direction and the second direction, to the lens JT with respect to the base mechanism 100 can be achieved.

The lens sealing sleeve 700 included in the lens adjustment module 1000 and the matching structure of and the lens adjustment module 1000 and the lens sealing sleeve 700 will be described in detail below and reference is also made to FIGS. 1 and 2 and related description of the embodiments of the lens sealing sleeve 700.

The lens sealing sleeve 700 includes a hollow cylindrical sleeve body 710. The sleeve body 710 is used to be sleeved on the outer circumference of the lens barrel TT of the lens JT and for the lens barrel TT to pass through. The sleeve body 710 includes a plurality of fold portions 711 arranged along an axial direction thereof. It can be known that the fold portion 711 is preferably sleeved on the outer circumference of the lens barrel TT. The sleeve body 710 is made of an elastic material such as silica gel, rubber and so on. By providing the fold portion 711, not only the amount of elastic deformation of the sleeve body 710 is increased so that when the first slider 210 or the second slider 310 has displacement, the sleeve body 710 can adapt to the displacement by generating an elastic deformation and keep the lens sealing sleeve 700 in a normal operation, but it is also possible to enhance the tightening force of the fold portion 711 being in close contact with the outer circumference of the lens barrel TT. An axial sealing structure is usually provided at a side of the lens barrel TT adjacent to the light emitting lens, for example, further referring to FIG. 11, in the present embodiment, the lens barrel TT is provided with an axial sealing structure CM that cooperates with the second adjustment mechanism 300, however, through the close contact of the fold portion 711 with the outer circumference of the lens barrel, it is possible to further prevent foreign matter from entering, along the axial direction of the sleeve body 710 via the gap between the fold portion 711 and the lens barrel TT, into a light incidence space IR at which a side of the light incidence lens IL receiving light is located. A first opening 712 and a second opening 713 are provided at two ends of the sleeve body 710, and the apertures of the first opening 712 and the second opening 713 are provided to match the lens barrel TT. The lens sealing sleeve 700 further includes a first connection portion 720 and a second connection portion 730. The first connection portion 720 includes a first protrusion at least partially surrounding the first opening 712 and correspondingly extending in a direction facing away from the center line of the first opening. The second connection portion 730 includes a second protrusion at least partially surrounding the second opening 713 and correspondingly extending in a direction facing away from the center line of the second opening. Preferably, the first protrusion 721 and the second protrusion 731 respectively extend in a radial direction parallel to the sleeve body 710. A third connection hole 319 corresponding to the first connection hole 722 is provided on a side surface of the second slider 310 facing away from the base body 110, and a fourth connection hole 114 corresponding to the second connection hole 732 is provided on a side surface of the base body 110 facing away from the second slider 310. The plurality of sleeve connection members TL connect the corresponding first and third connection holes 722 and 319 so as to connect the first connection portion 720 with the second slider 310, and the plurality of sleeve connection members TL connect the second and forth connection holes 732 and 114 so as to connect the second connection portion 730 with the base body 110. The sleeve body 710 located inside the first communication hole 318 and the second communication hole and the third communication hole are used for the lens barrel TT to pass through. According to the above, when the lens sealing sleeve 700 is sleeved on the outer circumference of the lens barrel TT, the lens sealing sleeve 700 can prevent foreign matter from directly entering, from the gap between the base mechanism 100, the first adjustment mechanism 200 and the second adjustment mechanism 300 via the outer circumference of the lens barrel TT, into the light incidence space IR at which a side of the light incidence lens IL receiving light is located, thereby reducing or eliminating the presence of foreign matter in the light incidence space IR, and avoiding the adverse effects of foreign matter on lens receiving light beam.

Figure 6:
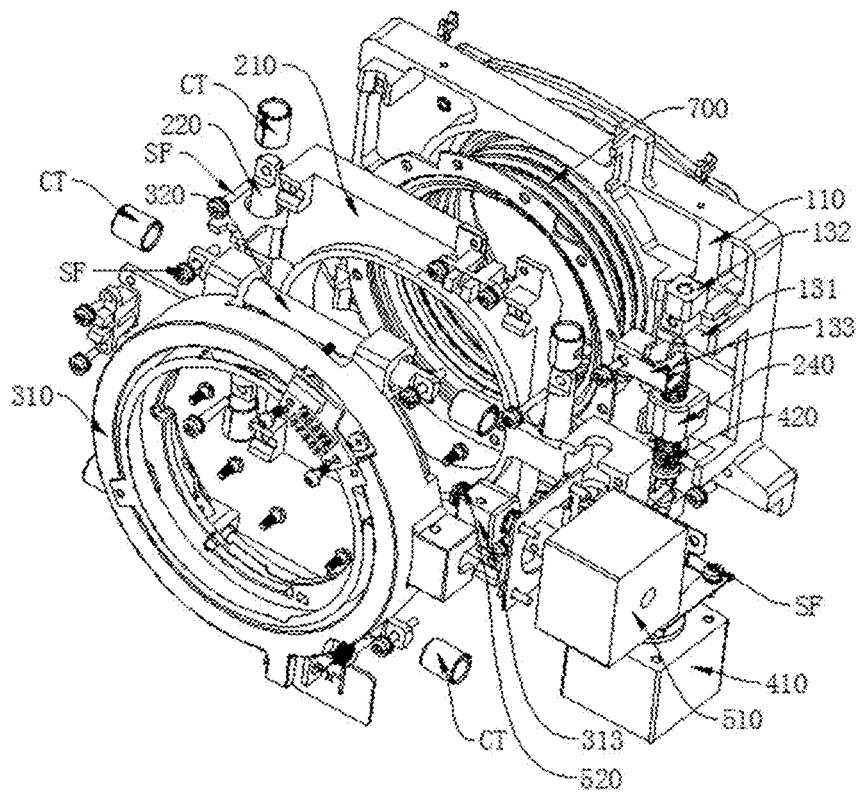
FIG. 6 is an exploded schematic diagram of FIG. 5.
Figure 7:
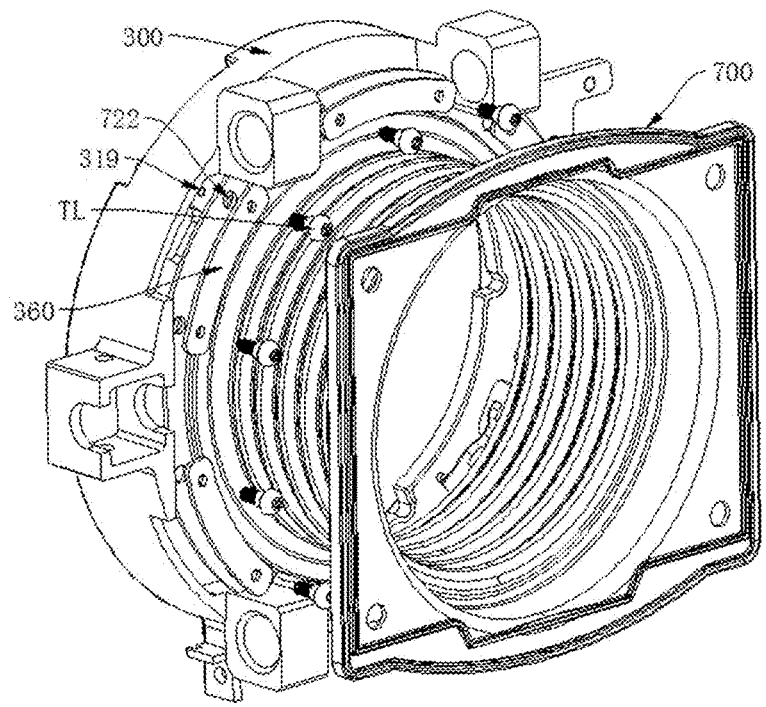
FIG. 7 is a schematic structural diagram mainly showing a second adjustment mechanism and a lens sealing sleeve of a lens adjustment module according to an embodiment of the present disclosure.
Figure 8:
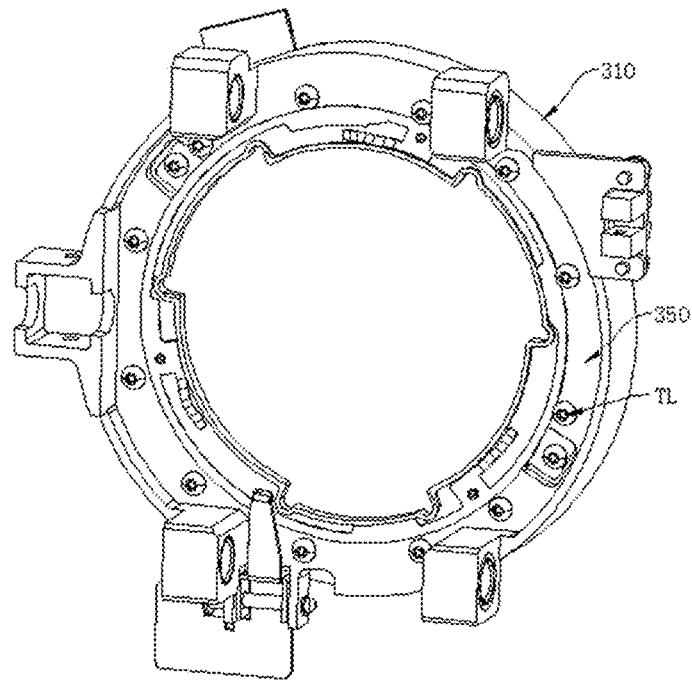
FIG. 8 is a schematic structural diagram mainly showing a second slider of a lens adjustment module according to an embodiment of the present disclosure.
Figure 9:
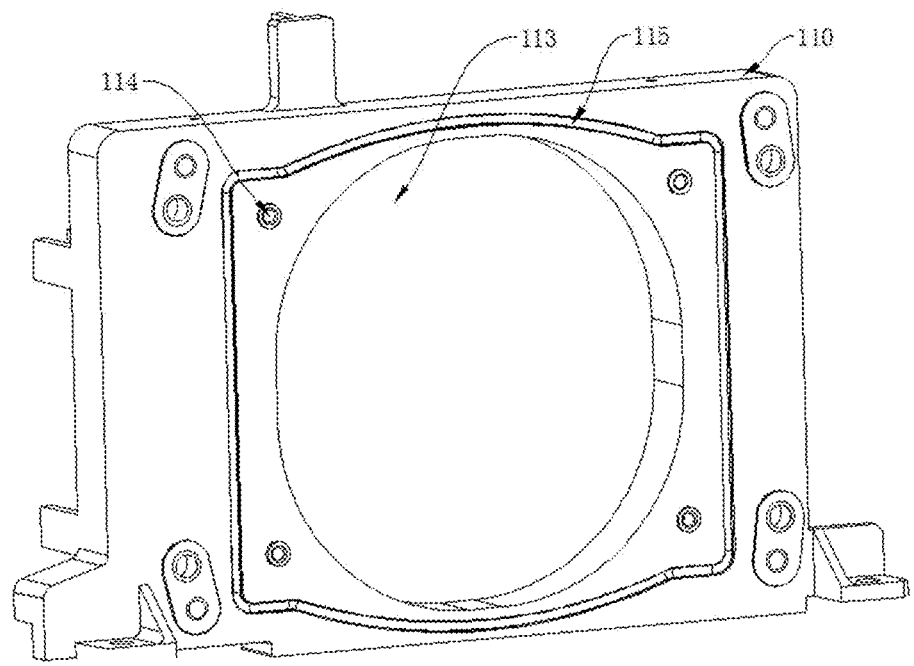
FIG. 9 is a schematic structural diagram mainly showing a base body of a lens adjustment module according to an embodiment of the present disclosure.
Figure 10:
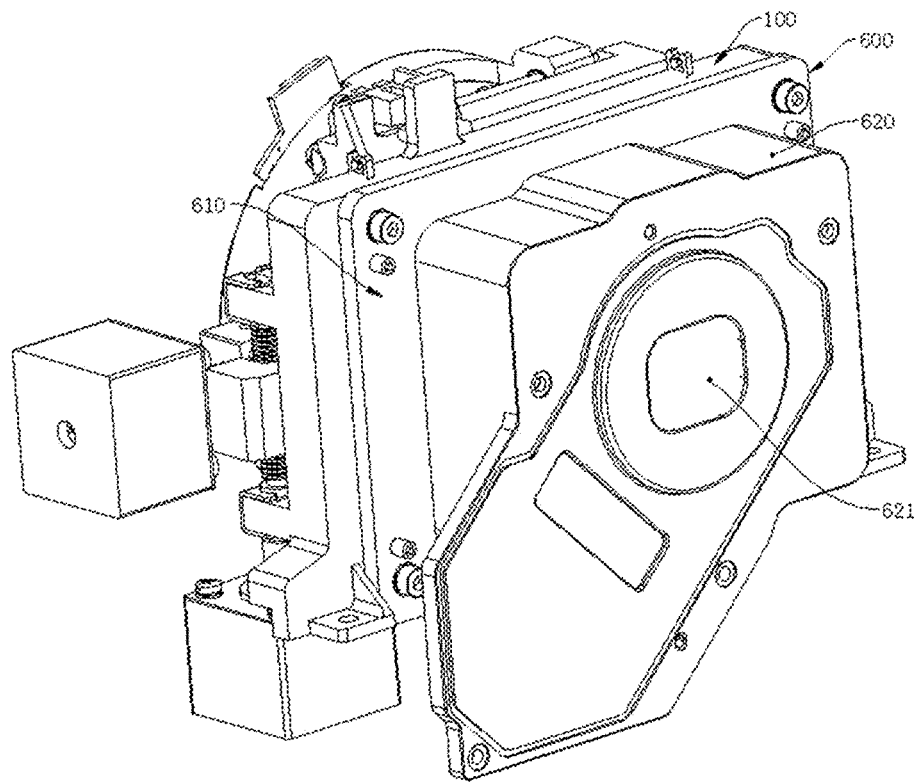
FIG. 10 is a schematic structural diagram of a lens adjustment module according to an embodiment of the present disclosure.
Figure 11:
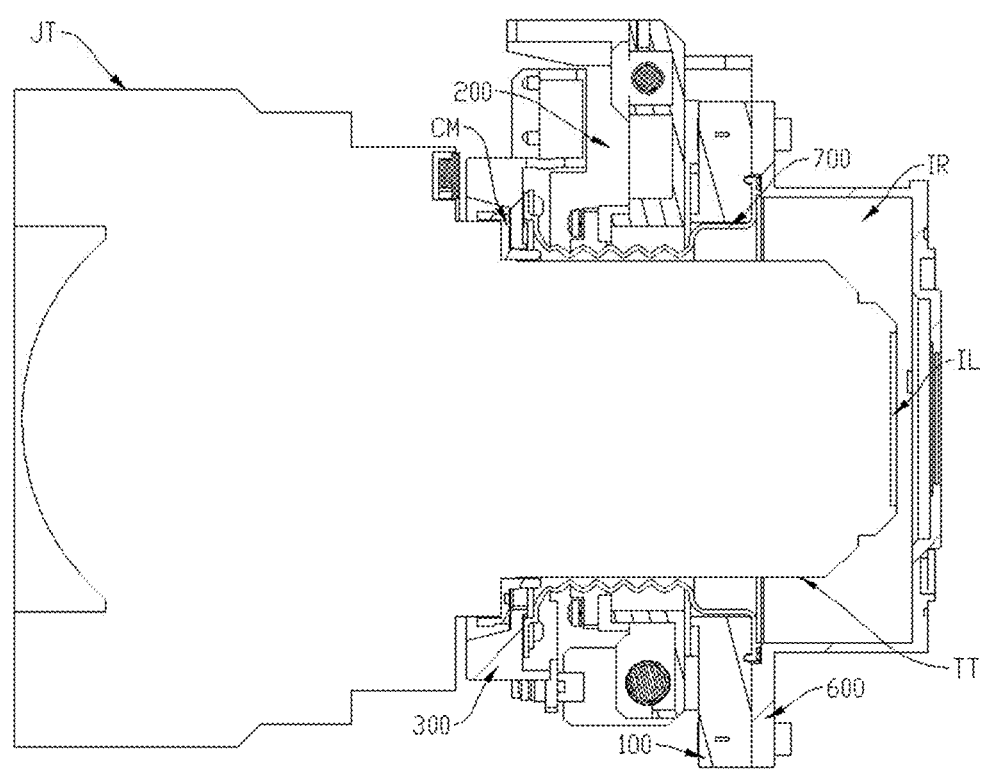
FIG. 11 is a cross-sectional diagram taken along a plane passing through a center line of the lens in FIG. 10.
Figure 12:
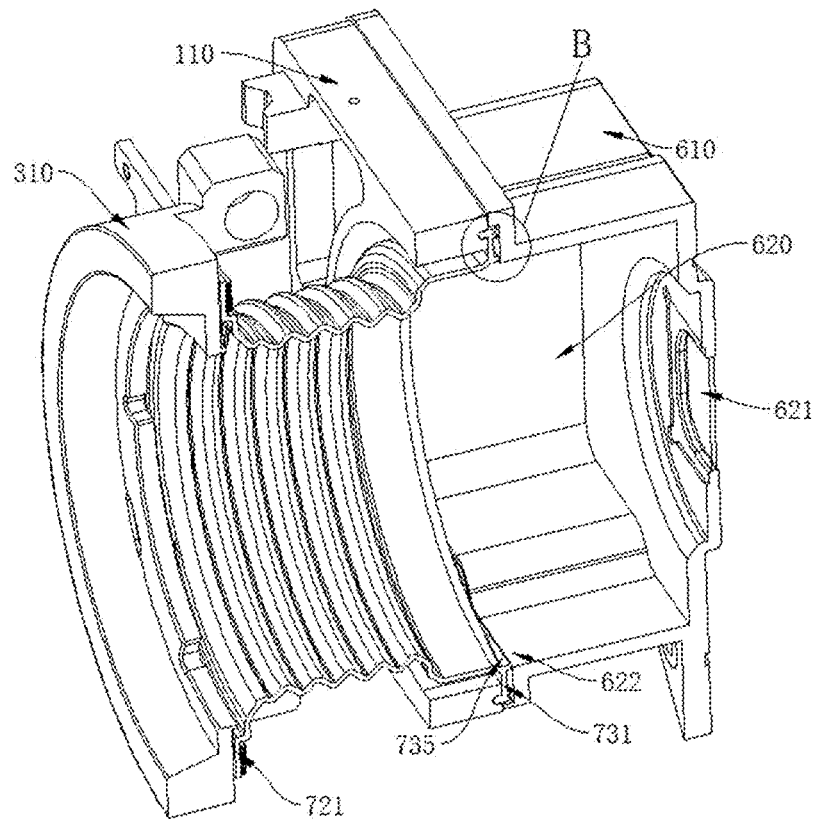
FIG. 12 is a partial cross-sectional diagram showing mainly the assembling structure of the lens sealing sleeve in FIG. 10.
Figure 13:
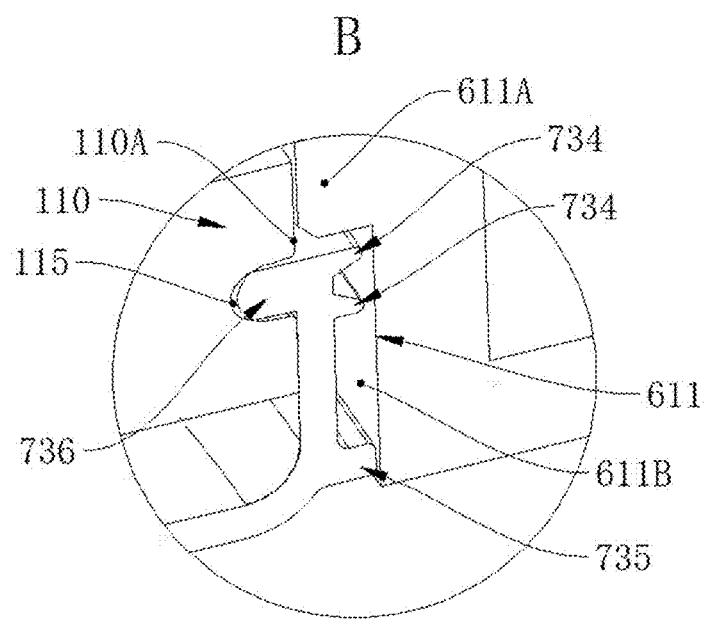
FIG. 13 is a partial enlarged diagram of a position B in FIG. 12.

As a specific implementation of the first protrusion 721, the first protrusion 721 includes a ring tab integrally surrounding the first opening 712, and a plurality of first connection holes 722 are evenly provided on the ring tab. A third connection hole 319 corresponding to the first connection hole 722 is provided on the annular surface 350 located at a side of the second slider facing the first slider. In this way, a uniform force can be provided for the close fitting of the ring tab and the annular surface 350 when the first protrusion 721 is fixed to the first slider through the plurality of sleeve connection members TL passing through the respective first connection holes 722, thereby achieving the strict sealing of the first opening 712 in its radial direction. Referring to FIGS. 1, 6, and 7 in conjunction, preferably, in the present embodiment, the first protrusion 721 includes a plurality of sector tabs that are arranged along the outer circumference of the first opening 712 with an interval, and the plurality of sector tabs surround the first opening 712 as a whole. The plurality of sector tabs are provided to include first sector tabs 723 each having two oppositely provided first connection holes 722 and two oppositely provided second sector tabs 724 each having four first connection holes 722, and the respective first connection holes 722 are symmetrically provided with the center of the first opening 712 as a center. Therefore, not only the gap between the adjacent sector tabs can provide a certain amount of deformation in the radial direction of the first opening 712 for each sector tab so as to lower the processing precision of the first protrusion 721, but the positioning of the first protrusion 721 when being fixed to the second slider can be facilitated depending on the difference in shapes of the first sector tab 723 and the second sector tab 724. Further, the lens adjustment module 1000 further includes a plurality of spacers 360 adapted to the shapes of the first sector tab 723 and the second sector tab 724. Each of the spacers 360 includes at least two pad holes, and the number of the pad holes is the same as the number of the first connection holes 722 provided on the first sector tab 723 and the second sector tab 724. Each of the sleeve connection members TL passes through the corresponding pad holes and is connected to the respective first connection holes 722. These spacers 360 can not only prevent the respective sleeve connection members TL from directly applying a force on the first sector tab 723 and the second sector tab 724, which would otherwise damage the first sector tab 723 and the second sector tab 724. Moreover, since each of the spacers 360 has a large surface area, a large range of force can be applied, by the respective spacer 360, to the opposite surfaces of the first sector tab 723 and the second sector tab 724 which are respectively fitted to the first slider, which achieves close fitting between the respective sector tab and the first slider and prevents foreign matter from entering through the space between the respective sector tab and the first slider.

Referring to FIGS. 1, 2, 10 to 14, as a specific embodiment of the second protrusion 731, the second protrusion 731 includes a protruding plate 733 integrally surrounding the second opening 713. A plurality of second connection holes 732 are provided on the protruding plate 733. At least one circle of protruding rib is provided on the first side surface of the protruding plate 733 facing away from the sleeve body 710. Moreover, the lens adjustment module 1000 further includes a lens adapter 600. In a projection apparatus such as a projector, the projector includes a light machine that generates a light beam for projection. In order to transmit the light beam generated by the light machine to the lens, a lens adapter 600 is usually provided between the light machine and the lens. It should be noted that, regarding to the present embodiment, the lens adapter 600 may be a separate component for connecting the base body 110 with the light machine (not shown), or may be a component included in the light machine, for example, the lens adapter 600 and the light machine are formed into one piece. The lens adapter 600 is connected to the base body 110, and the connection can be achieved, for example, by connecting the lens adapter 600 and the corresponding pair of threaded holes on the base body 110 with screws. The lens adapter 600 includes a shelf 610, and the shelf side-portion 611 of the shelf 610 facing the base body 110 abuts against the protruding rib. In this case, after the second protrusion 731 is fixed to the base body 110 by the plurality of sleeve connection members TL passing through the respective first connection hole 722, the lens adapter 600 is fixedly connected to the base body 110 and the second protrusion 731 is sandwiched between the base body 110 and the shelf side-portion 611, such that the at least one circle of the protruding rib abuts against the shelf side-portion 611, achieving the technical effect of sealing the gap between the second protrusion 731 and the shelf side-portion 611. Therefore, the side of the light incidence lens IL receiving light is located in the sealed light incidence space IR enclosed by the lens adapter 600 and the base body 110, and is substantially unaffected by the foreign matter.

Further, the lens adapter 600 includes a receiving cavity 620 that is formed by the shelf 610 and extends in a direction facing away from the base body 110. The lens barrel TT is partially received in the receiving cavity 620. The receiving cavity 620 is provided with a light transmission portion 621 for the light beam to enter the lens. The light transmission portion 621 includes a light transmitting lens hermetically fixed on the shelf 610. The protruding rib is used to seal the receiving cavity 620, therefore it can be seen that the receiving cavity 620 located between the base body 110 and the lens adapter 600 is a sealed space due to the function of the protruding rib. The side of the light incidence lens IL receiving light is located in the receiving cavity 620, and the light incidence lens IL can receive the light beam entering via the light transmission portion 621 substantially without being affected by the foreign matter, thereby achieving excellent quality of the emitted light of the lens and the projected image.

Referring to FIGS. 10 through 13 in conjunction, preferably, the shelf side-portion 611 includes a flange 611A and a racking surface 611B. A recess 115 is provided on the base body surface 110A of the base body 110 facing the shelf 610. At least one circle of protruding edge 736 is provided at an edge of the second side surface of the protruding plate 733 facing the sleeve body 710. The flange 611A abuts against the base body surface 110A. The protruding edge 736 is inserted into and connected to the recess 115. Moreover, in the present embodiment, the protruding rib includes two circles of the first protruding rib 734 provided at an outer edge of the first side surface of the protruding plate 733. Preferably, the two circles of the first protruding ribs 734 are equally spaced, and the protruding rib further includes a circle of second protruding rib 735 that is closer to the second opening 713 than the first protruding rib 734. Preferably, the second protruding rib 735 is spaced apart from the first protruding rib 734 closest thereto with a variable interval. The first protruding rib 734 and the second protruding rib 735 both abut against the racking surface 611B. Through providing the above structure, when the lens adapter 600 is fixedly connected to the base body 110, substantially no gap exists between the lens adapter 600 and the base body 110 or the gap is very small by the flange 611A abutting against the base body surface 110A; By inserting into and connecting the protruding edge 736 to the recess 115, the stability of the second protrusion 731 being fixed on the base body 110 can be improved. Moreover, since the gap between the lens adapter 600 and the base body 110 faces a portion of the protruding plate 733 between the protruding edge 736 and the two circles of the first protruding rib 734, the protruding edge 736 has a certain shunting function on the foreign matter entering from the gap, thereby improving the sealing performance of the lens sealing sleeve 700; by providing two circles of the first protruding rib 734 and one circle of the second protruding rib 735, multiple sealing functions between the lens adapter 600 and the base body 110, in other words, in the radial direction of the second opening 713, are provided together to prevent foreign matter from entering the second opening 713 via the gap between the protruding plate 733 and the shelf 610.

Further, each circle of the first protruding rib 734 includes a pair of first straight segments (unmarked) opposite to each other and a pair of curved segments (unmarked) that are opposite to each other and distancing away from a center of the second opening 713 in the radial direction of the second opening 713. The second protruding rib 735 includes a pair of second straight segments (unmarked) that are opposite to each other and respectively parallel to the first straight segments, and a pair of head-shoulder segments 735A opposite to each other. Each head-shoulder segment 735A includes two shoulder segments 735A2 and one head segment 735A1 therebetween. Moreover, a pair of head segments 735A1 of the pair of head-shoulder segments 735A are close to the outer circumference of the second opening 713, and the pair of head segments 735A1 are preferably tangent to the outer circumference of the second opening 713. The second protruding rib 735 is close to the cavity surface 622 of the receiving cavity 620. Preferably, the second protruding rib 735 is substantially flush with the cavity surface 622 of the receiving cavity 620. By providing the straight segment, the curved segment and the head-shoulder segment 735A above, the irregularities of the shapes of the first protruding rib 734 and the second protruding rib 735 are improved, and the sealing performance thereof can be increased. Besides, by approaching the pair of head segments 735A1 to the outer circumference of the second opening 713 and approaching the second protruding rib 735b to cavity surface 622 of the receiving cavity 620, the pair of head segments 735A1 can be brought closer to the vicinity of the outer circumference of the second opening 713 and the second protruding rib 735 can be brought closer to the vicinity of the cavity surface 622, so as to play a sealing role, thereby improving the sealing performance of the second protruding rib 735.

The following focuses on the structure of the lens adjustment module 1000 regarding lens position-adjustment, for further description.

Referring to FIG. 4 to FIG. 6 and FIG. 14 to FIG. 18 in conjunction, as a specific implementation of the lens adjustment module 1000 of the present embodiment, the base body 110 is provided with two sets of first support portions arranged along the first direction. The first adjustment mechanism 200 includes a first sliding bar 220 that is inserted through the first slider 210 and two sets of second support portions arranged on the first slider 210 in the second direction. The second adjustment mechanism 300 includes a second sliding bar 320 that is inserted through the second slider 310. The first sliding bar 220 is supported and fixed on the first support portion, and the second sliding bar 320 is supported and fixed on the second support portion. The first slider 210 is moved under the guidance of the first slider 220 and the second slider 310 is moved under the guidance of the second slider 320. The lens adjustment module 1000 further includes a pair of first sliding sleeves 250 provided on the first slider 210 and sleeved on the circumference of the second sliding bar 220 respectively, and a pair of second sliding sleeves 330 provided on the peripheral wall of the second slider 310 and sleeved on the outer circumference of the second sliding bar 320 respectively.

For the first support portion and the second support portion described above, in the present embodiment, referring specifically to FIGS. 6 and 14 to 16, the first adjustment mechanism 200 and the second adjustment mechanism 300 each include a plurality of threaded fixing members SF. The two sets of the first support portions are two pairs of first bosses 120, and the two sets of the second support portions are two pairs of second bosses 230. The first boss 120 and the second boss 230 have an inverted trapezoidal surface or an arc surface, and in the present embodiment, an inverted trapezoidal surface is used. The first sliding bar 220 and the second sliding bar 320 are each a substantially cylindrical rod including two free ends of a D-shaped cross section and a cylinder between the two free ends. The D-shaped cross section is formed by breaches 221, 321 provided at the free end, i.e., corresponding to the D-shaped cross section, each of the free ends includes curved surfaces 222, 322 and crimping surfaces 223, 323 formed by the breaches 221, 321. The arc surface and the curved surface above are preferably circular arc surfaces. Penetrating holes 224, 324 are provided between the curved surfaces 222, 322 and the crimping surfaces 223, 323. The curved surfaces 222, 322 abut against the inverted trapezoidal surfaces of the first boss 120 and the second boss 230. The respective threaded fixing members SF, for example screws, are respectively connected to the threaded fixing holes 121, 231 (for example, internal threaded holes) on the first boss 120 and the second boss 230 by passing through the curved surfaces 222, 322 via the penetrating holes 224, 324, and the screw heads of the respective screws are pressed against the crimping surfaces 223, 323, thereby achieving that the first sliding bar 220 and the second sliding bar 320 are reliably supported and fixed by the first boss 120 and the second boss 230.

Figure 17:
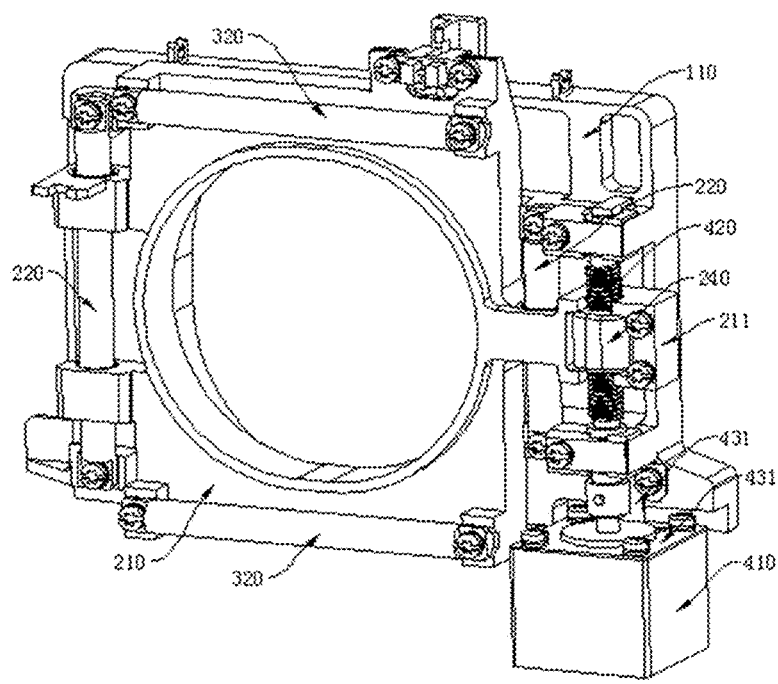
FIG. 17 is a schematic structural diagram mainly showing the assembled state of a base mechanism, a first adjustment mechanism, and a first electric driving mechanism of a lens adjustment module according to an embodiment of the present disclosure.
Figure 18:
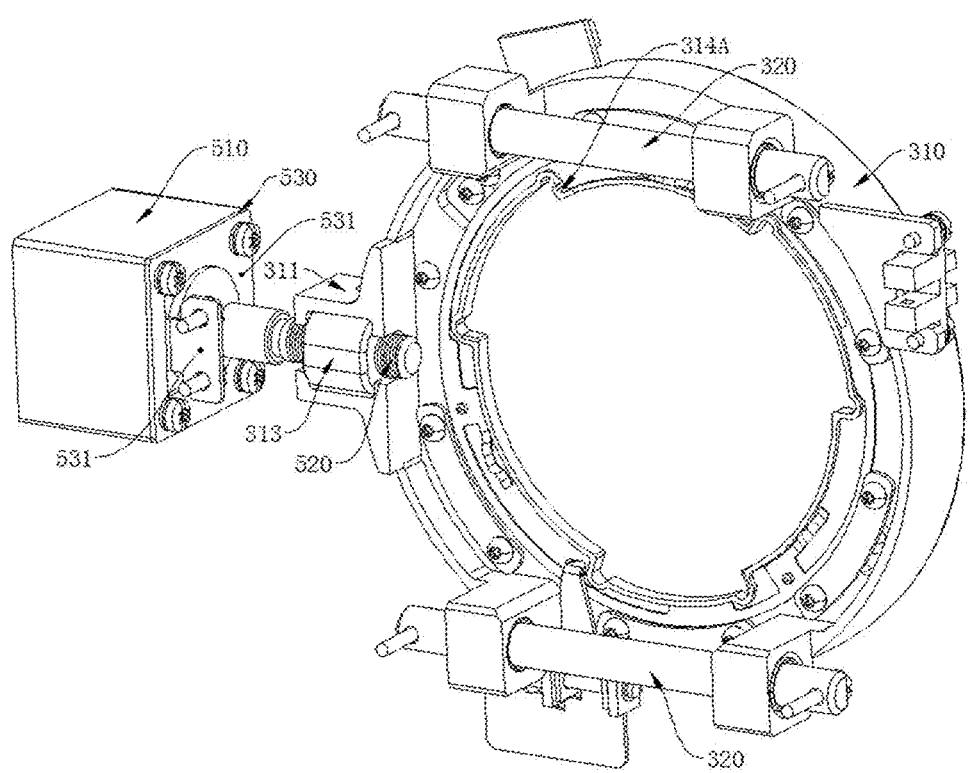
FIG. 18 is a schematic structural diagram mainly showing the assembled state of a second adjustment mechanism and a second electric driving mechanism of a lens adjustment module according to an embodiment of the present disclosure.

Referring to FIGS. 6, 17, and 18 in conjunction, the lens adjustment module 1000 of the present embodiment will be described in more detail below. The first motor 410 may be fixedly connected to the base body 110 by a first fixing tab 430 substantially of L-shape, and the second motor 510 may be fixedly connected to the first slider 210 by a second fixing tab 530 substantially of L-shape. Specifically, the substantially L-shaped first fixing tab 430 and the substantially L-shaped second fixing tab 530 each include two first sub-fixing tabs 431 and two second sub-fixing tabs 531 provided at substantially right angles. The two first sub-fixing tabs 431 are respectively provided with a pair of threaded connection holes corresponding to the base body 110 and the first motor 410. The two second sub-fixing tabs 531 are respectively provided with a pair of threaded connection holes corresponding to the boss and the second motor 510. The respective pairs of threaded connection holes are each threaded to a screw, for example, as a threaded fixing member SF. From the above, the first motor 410 and the second motor 510 are fixed by the L-shaped first fixing tab 430 and second fixing tab 530, such that the first motor 410 is indirectly connected with respect to the base body 110 without direct contact and the second motor 510 is indirectly connected with respect to the first slider 210 without direct contact, which can buffer the inevitable vibration generated when the first motor 410 and the second motor 510 are running, thereby preventing the adverse circumstances of undesired positional change of the lens JT caused by the larger vibration or even displacement of the base body 110 and the first slider 210 generated by being affected by vibration. In addition, since the connection of each motor and its corresponding screw rod in a transmission way is generally a rigid connection, space for a certain relative movement can be provided for each corresponding motor and screw rod by providing the L-shaped first fixing tabs 430 and second fixing tabs 530, thereby avoiding the damage caused by the excessive torque generated by the excessive interaction between the respective motor and the screw rod, and improving the reliability of the lens adjustment module.

Figure 14:
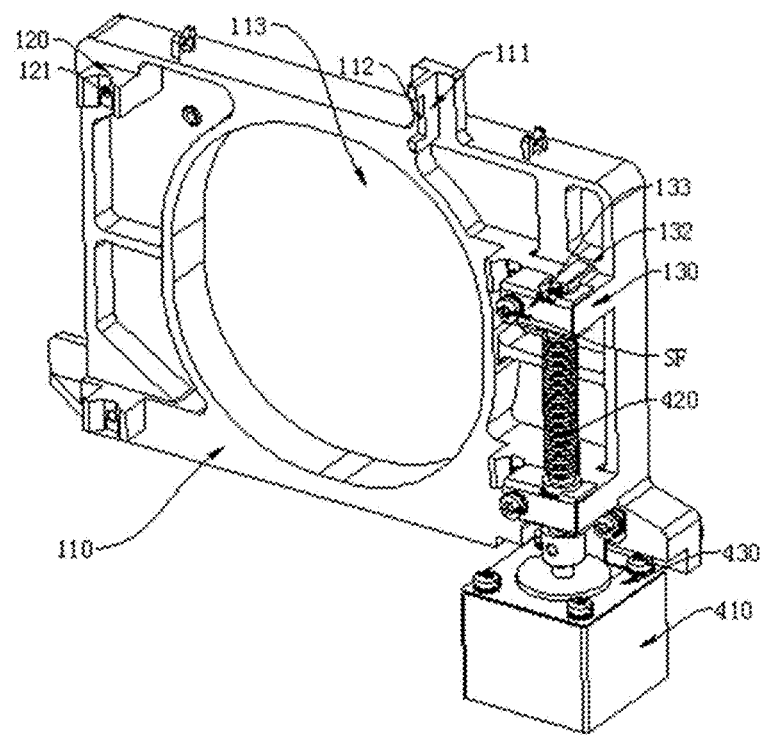
FIG. 14 is a schematic structural diagram mainly showing a base mechanism of a lens adjustment module according to an embodiment of the present disclosure.

Referring to FIGS. 6 and 14 in combination, in order to securely fix the first screw rod 420, as a further improvement, the base mechanism 100 further includes a pair of rod fixing assemblies for fixing two ends of the first screw rod 420. Each of the rod fixing assemblies includes a support seat 130 provided on the base body 110 and a cover plate 133 fixedly connected to the support seat 130. The support seat 130 has a slot 131 for receiving the shaft sleeve 132. Two opposite ends of the first screw rod 420 are respectively inserted into and connected to the shaft sleeve 132. A pair of threaded holes is correspondingly provided on the cover plate 133 and the support seat 130 by screw connection, so as to fixedly connect the cover plate 133 with the support seat 130, and thus the cover plate 133 fixes the shaft sleeve 132 in the slot 131.

Figure 15:
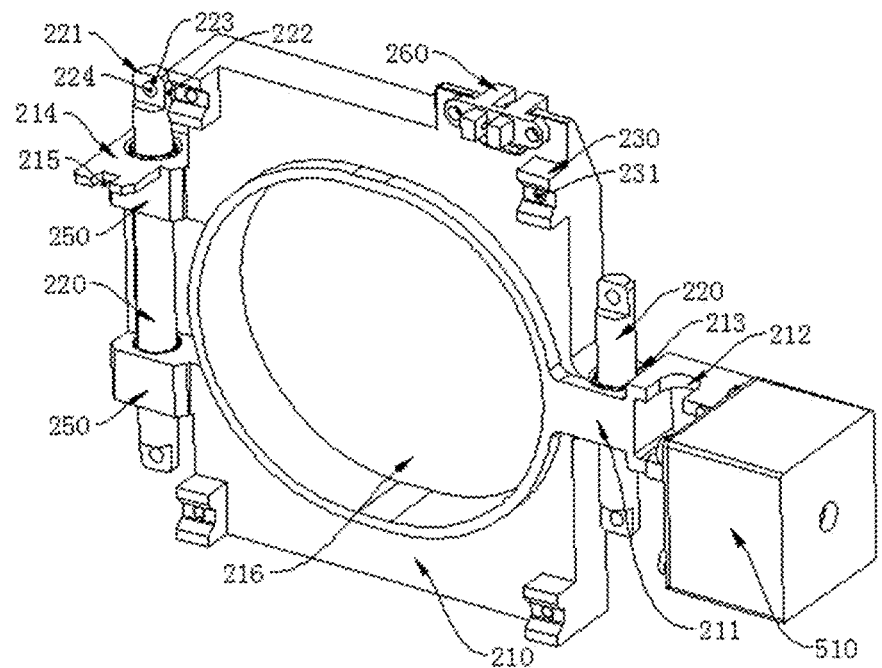
FIG. 15 is a schematic structural diagram mainly showing a first adjustment mechanism of a lens adjustment module according to an embodiment of the present disclosure.

Referring to FIGS. 6, 14, and 15 in conjunction, the first slider 210 of the lens adjustment module 1000 further includes a first protruding portion 211. The first protruding portion 211 includes a first through slot 212 that extends sequentially from the first side surface of the first slider 210 in a direction facing away from the first communication hole 113 and parallel to the second direction and is used for passage of the first screw rod 420. Preferably, the free end of the first protruding portion 211 may be provided with a boss for fixed connection with the second fixing tab 530. A first transmission block 240 screwed to the first screw rod 420 is fixed in the first through slot 212. For example, the first transmission block and the first protruding portion are correspondingly provided with a threaded hole, and the respective threaded holes are connected by a threaded member, such as a screw, to fix the first transmission block in the first through slot to achieve reliable transmission thereof. The first transmission block 240 may specifically be a columnar body having an internal threaded hole, for example, the first transmission block 240 is a movable nut. The threaded connection of the first transmission block 240 and the first screw rod 420 can be understood as the cooperation of the internal thread and the external thread. During rotation of the first screw rod 420, the internal thread of the first transmission block 240 will move in the first direction by being subjected to the force of the external thread of the first screw rod 420, so that the first transmission block 240 abuts against one of a pair of first slot surfaces of the first through slot 212 opposite to each other in a first direction and drives the first protruding portion 211 to move by applying force to one of the first slot surfaces. It can be seen that the first transmission block 240 functions as the above transmission component. From the above, by providing the first transmission block 240 on the first slider 210, the first transmission block 240 is in surface contact with the first slot surface. Therefore, the force applied to the first slot surface by the first transmission block 240 is uniform, so that the first slider 210 moves smoothly. In addition, by controlling the rotation angle of the first screw rod 420, the moving distance of the first transmission block 240 and thus the first slider 210 can be precisely controlled.

Referring to FIGS. 6 and 14 to 16, as a specific implementation of the first sliding bar 220 being inserted through the first slider 210 and the second sliding bar 320 being inserted through the second slider 310, a pair of first sliding sleeves 250 having a first guiding hole are provided on the second side surface of the first slider 210 opposite to the first side surface. The first sliding sleeves 250 are sleeved on the outer circumference of the first sliding bar 220. The first protruding portion 211 further includes a through hole 213 that is located between the third communication hole 216 and the first through slot 212 and used for the first sliding bar 220 to pass through. Two pairs of second sliding sleeves 330, arranged opposite to each other and having a second guiding hole, are provided on the peripheral wall of the second slider 310, and the second sliding sleeves 330 are sleeved on the outer circumference of the second sliding bar 320. It can be known that the through hole 213 similarly functions as the first sliding sleeve 250, whereby the first slider 210 can move parallel to the first direction via the first sliding sleeve 250 and the through hole 213 under the guidance of one first sliding bar 220, respectively. The second slider 310 can move parallel to the second direction via the two pairs of second sliding sleeves 330 under the guidance of one second sliding bar 320, respectively. Therefore, the frictional resistance during movement of the sliding sleeve or the through hole relative to the sliding bar can be greatly reduced by the cooperation of the corresponding sliding sleeve and the sliding bar and the cooperation of the through hole and the sliding bar, thereby achieving excellent smoothness that the movement of the first slider 210 and the second slider 310. In addition, in other embodiments, in order to further reduce the frictional resistance, an oil-free bushing CT may be provided in each of the first sliding sleeve 250, the through hole 213, and the second sliding sleeve 330. Preferably, the first sliding sleeve 250 is inte-grally formed with the first slider 210 and the second sliding sleeve is integrally formed with the second slider 310, so that the structure can be simplified and the cost can be reduced. Further, by providing the first protruding portion 211 having the through hole 213 and the first through slot 212, not only the guiding and driving of the first sliding bar 220 and the first screw rod respectively to the first slider 210 are achieved, but also the axes of the first sliding bar 220 and the first screw rod 420 are ensured to have a high parallelism, such that the movement of the first slider 210 is smooth and accurate, and the overall structure of the lens adjustment module is also compact.

Preferably, the projections of the first slider 220 and the second slider 320 on the base body 110 are substantially quadrate, and the quadrate may be rectangular or square. The base body 110 is a substantially rectangular plate member having a first communication hole 113, and the first slider 210 is a substantially rectangular plate member having a third communication hole 216. The second slider 310 is a substantially cylindrical plate member having a fourth communication hole 318. By arranging the base body 110 and the first slider 210 into a substantially rectangular plate member and substantially cylindrical plate member, the stacking arrangement of the two can be facilitated. Moreover, the lens JT can be better adapted through the substantially cylindrical plate member of the second slider 310, thereby jointly reducing the space occupied by the lens adjustment module.

Figure 16:
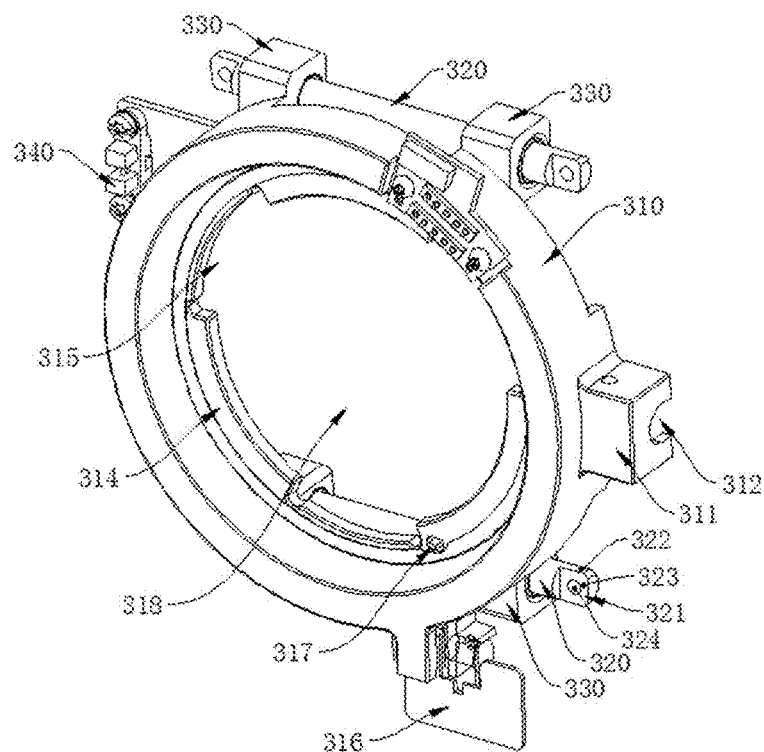
FIG. 16 is a schematic structural diagram mainly showing a second adjustment mechanism of a lens adjustment module according to an embodiment of the present disclosure.

Referring to FIGS. 14 to 16, in order to more accurately control the movement of the first slider 210 and the first slider 210, preferably, the matching first opening 112 is provided on the base body 110 and a first photoelectric sensor 260 is provided on the first slider 210, and the matching second opening 215 is provided on the first slider 210 and a second photoelectric sensor 340 is provided on the second slider 310. It can be seen that the positions of the respective matching openings and photoelectric sensors can also be adjusted accordingly. The first opening 112 extends in the first direction, and the second opening 215 extends in the second direction. Preferably, the extending distance of the first opening 112 in the first direction is set to be equal to a preset moving distance of the first slider 210 in the first direction. The extending distance of the second opening 215 in the first direction is set to be equal to a preset moving distance of the second slider 310 in the second direction. Each photoelectric sensor includes a light emitting portion and a light receiving portion, and each of the openings allows detection light emitted by the light emitting portion that is matched therewith to pass through and be received by the light receiving portion. Specifically, the lens adjustment module includes a controller, or a projection apparatus equipped with the lens adjustment module includes a controller. Each photoelectric sensor and each electric driving mechanism are electrically connected to the controller, respectively. When the first slider 210 or\and the second slider 310 are about to move and when they are moving, the light emitting portion of the respective photoelectric sensor emits detection light, and if the corresponding light receiving portion of the respective photoelectric sensor can receive the detection light, the controller determines that each slider is located in the preset moving distance. The controller allows the motor included in each of the electric driving mechanisms to operate so as to drive the first slider 210 and/or the second slider 310 to move. While if the corresponding light receiving portion of the respective photoelectric sensor cannot receive the detection light, the controller determines that each slider is about to be outside the preset moving distance, and the controller controls the motor to stop working so as to achieve that the movement of the first slider 210 and the second slider 310 does not exceed the preset moving distance, which helps to reliably and accurately adjust the position of the lens JT. In addition, it is preferable that if a certain bracket has been accidentally located outside the preset moving distance, the controller controls the corresponding motor to drive the certain bracket to move to its preset moving distance, for example, one-half of its preset moving distance, to maintain the normal operation of the certain bracket.

Further, the first opening 112 is provided on the first protrusion 111 of one side surface of the base body 110. The second opening 215 is provided on the second protrusion 214 of one first sliding sleeve 250. The first photoelectric sensor 260 is fixed on the third side surface of the first slider 210, and the second photoelectric sensor 340 is fixed on the outer circumference of the second slider 310. With such arrangement, the structure in which the respective openings are provided and the photoelectric sensors are fixed is basically formed by an integral molding method. Therefore, it is not necessary to specifically provide other separate components, so as to make the overall structure of the lens adjustment module compact, and thus the occupancy space is small and the cost is reduced.

Referring to FIGS. 6, 17, and 18, as an alternative implementation, the second slider 310 includes, for example, a second protruding portion 311 extending away from its outer circumference. A second through slot 312 through which the second screw rod 520 passes is provided in the second protruding portion 311. A second transmission block 313 screwed to the second screw rod 520 is fixed in the second through slot 312. For example, the second transmission block and the second protrusion are correspondingly provided with a threaded hole, and the respective threaded holes are connected by a threaded member, such as a screw, so as to fix the second transmission block in the second through slot to achieve reliable transmission thereof. The second transmission block 313 may be a columnar body having an internal threaded hole, for example, the second transmission block 313 is a movable nut. The threaded connection of the second transmission block 313 and the first screw rod can be understood as the cooperation of the internal thread and the external thread. During rotation of the second screw rod 520, the internal thread of the second transmission block 313 will move in the second direction by being subjected to the force of the external thread of the second screw rod, so that the second transmission block 313 abuts against one of a pair of second slot surfaces of the second through slot 312 opposite to each other in the second direction and drives the second protruding portion 311 to move by applying force to one of the second slot surfaces. It can be seen that the second transmission block 313 functions as the above transmission component. It can be seen that by providing the second transmission block 313 on the second slider 310, the second transmission block 313 is in surface contact with the second slot surface. Therefore, the force applied to the second slot surface by the second transmission block 313 is uniform, so that the second slider 310 can smoothly move. In addition, by controlling the rotation angle of the second screw rod 520, the moving distance of the second transmission block 313 can be accurately controlled, and then the second slider 310 is moved by the movement of the second transmission block 313.

Figure 4:
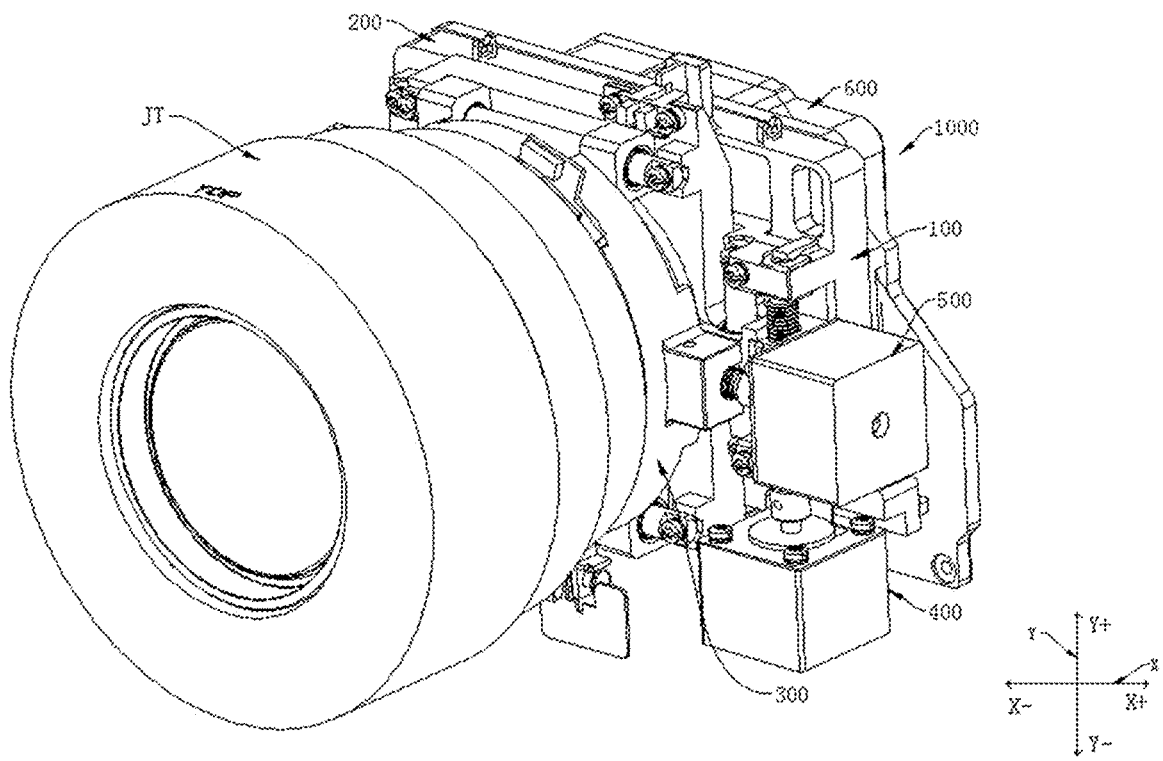
FIG. 4 is a schematic structural diagram of a lens adjustment module according to an embodiment of the present disclosure, with a lens assembled thereto.
Figure 5:
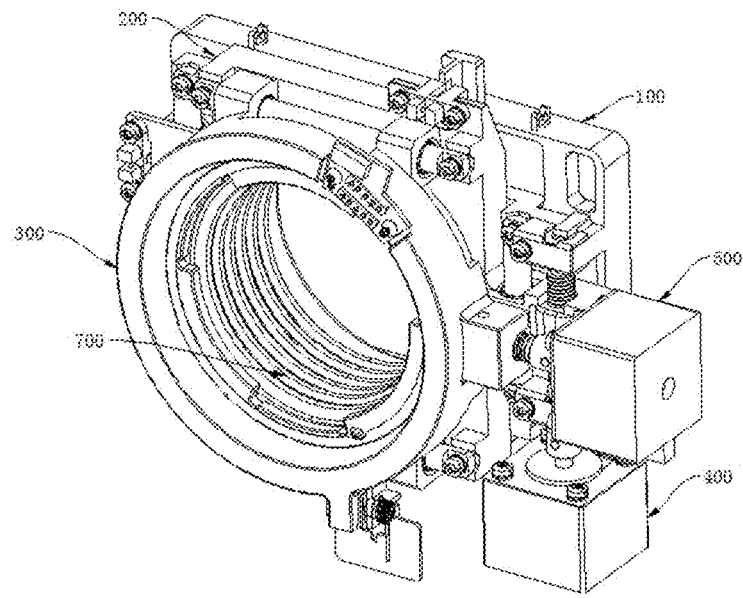
FIG. 5 is a schematic structural diagram of a lens adjustment module according to an embodiment of the present disclosure, with no lens and omitting a lens adapter.

Referring to FIGS. 4 and 16, in order to achieve a good fixation of the second slider 310 and the lens JT, preferably, a plurality of rib plates 314 are provided on the second slider 310 at equal intervals along the circumferential direction of the fourth communication hole 318. An opening 315 is provided between two adjacent rib plates 314. The respective openings 315 are equally spaced apart in the circumferential direction between two adjacent rib plates 314. The plurality of openings 315 are used for passage of the corresponding plurality of projections (not shown) provided on the outer circumference of the frame of the lens JT and rotate by a certain angle, such that the plurality of rib plates 314 and the plurality of projections overlap with each other and are snap-connected, thereby preventing the lens JT from coming off the second slider 310 by the interference fit of the rib plates 314 in one-to-one correspondence with the projections. While when the lens JT needs to be separated from the second slider 310, the plurality of projections may be rotated in opposite directions to cause the plurality of projections to be completely staggered from the plurality of rib plates 314 and opposite to the plurality of openings 315. It can be seen that the above-described rotation of the projections of the lens JT can be achieved by manually rotating the entire frame of the lens JT. Therefore, when the first slide 210 moves in the first direction, the first slider 210 drives the second slider 310 to move through the first sliding bar 220 during the movement, while the second slider 310 applies a force to the respective projections through the respective rib plates 314 so as to drive the lens JT to move in the first direction. When the second slider 310 moves in the second direction, the second slider 310 applies a force to the respective projections through the respective rib plates 314 so as to drive the lens JT to move in the second direction.

Referring further to FIG. 18, in order to better achieve the fixed connection of the second slider 310 and the lens JT, further, a position-limiting bump 314A is provided on a surface of one of the rib plates 314 facing the first slider 210. The position-limiting bump 314A approaches the adjacent opening 315 in the rotation direction of the plurality of projections. The position-limiting bump 314A abuts against an end face of one of the projections. Through abutting of the position-limiting bump 314A of the first slider 210 against the end face of the projection of the lens JT, it is possible to indicate whether the respective projections of the lens JT are rotated into the right position after passing through the respective openings 315, thereby preventing the rotation angle of the projection of the lens JT from being too large or too small and achieving that the plurality of rib plates 314 and the plurality of projections are well snap-connected with each other.

In order to better fixedly connect the second slider 310 to the lens JT, further, the second slider 310 is provided with a latching mechanism, and the latching mechanism includes a pick 316 and a snap hook 317. The snap hook 317 is used for locking with a snap slot provided by the lens. A snap opening is formed on a surface of one of the rib plates 314 facing away from the first slider 210. The pick 316 is connected to a torsion spring and is elastically resettable to move the snap hook 317 into or out of the snap opening to enable the snap hook 317 to be used for locking or unlocking the snap slot. Therefore, in the locked state, the lens JT and the second slider 310 are locked and fixed, and only in the unlocked state, the respective projections of the lens JT can be rotated to oppose the plurality of openings 315 and further pulled away from the second slider 310.

In summary, the lens adjustment module 1000 utilizes the lens position-adjustment structure including the first adjustment mechanism 200 and the second mechanism 300 to achieve reliable and precise adjustment of the lens position so as to place the lens in a working position at which the definition of the image projected onto the screen by the lens is relatively optimal. Moreover, the lens sealing sleeve 700, in one aspect, prevents contamination on the light incidence lens IL of the lens caused by the foreign matter passing from the reserved gap for lens displacement of the lens adjustment module 1000; and in another aspect, the lens sealing sleeve 700 provides good sealing between the base body 110 and the lens adapter 600, so that the light incidence lens IL is always in the sealed light incidence space IR. Therefore, the lens can receive the light beam well so as to emit a high-quality projection image.

Embodiment of a Projection Apparatus

As still another object of the present disclosure, the present disclosure also provides a projection apparatus, and the projection apparatus includes a lens JT, a light machine, and a lens adjustment module in any one of the lens adjustment module embodiments. The lens JT is fixedly connected to the second slider 310, and the lens barrel TT of the lens JT passes through the lens sealing sleeve 700. The lens adapter 600 is respectively connected to the base body 110 and the light machine. Moreover, the shelf 610 of the lens adapter 600 facing away from the base body 110 is provided with a light transmission portion 621 for the light beam emitted from the light machine to transmit and enter the lens JT. Thereby, a side of the light incidence lens IL of the lens receiving light is located in the sealed light incidence space IR enclosed by the lens adapter 600 and the base body 110. Therefore, when the light beam, generated by the light source, an optical lens group, and the like included in the light machine in the projection apparatus, is incident on the light incidence lens IL of the lens JT via the light transmission portion 621, the light incidence lens IL can receive the light beam substantially without being affected by foreign matter, achieving that the lens emitting light and the quality of the projected image of the projection apparatus are excellent.

The above is a further detailed description of the present disclosure in connection with the specific embodiments, and the specific embodiments of the present disclosure are not construed to limit to the description. A number of simple derivations or substitutions may be made without departing from the inventive concept by those skilled in the art to which the present disclosure belongs. In addition, the technical solutions between the various embodiments may be combined with each other, but must be based on what can be implemented by those skilled in the art. When the combination of technical solutions is contradictory or unrealizable, it should be considered that the combination of such technical solutions does not exist and is not within the protection scope required by the present disclosure.

In the present disclosure, the term "substantially" is intended to mean a general description of the related shape, angle, position, number and the like, and precise limitations are not required, unless otherwise specifically stipulated and defined. The terms "connect", "fix" and the like should be understood broadly. For example, "fix" may be a fixed connection, or may be a detachable connection, or integrated; can be directly connected or indirectly connected through an intermediate medium, also can be the internal communication of two elements or the interaction of two elements. The terms "first", "second", and the like are used for descriptive purposes only and are not to be understood as indicating or implying a relative importance or implicitly indicating the number of technical features indicated. Thus, technical features defining "first", "second", etc., may explicitly or implicitly include one or more of the features. In addition, the "first direction" and the "second direction" as described and illustrated in the drawings are explained by taking the horizontal and vertical directions as examples, respectively. However, according to the actual working condition of the lens adjustment module, the first direction and the second direction may also be other corresponding directions. Therefore, the specific meaning of the above terms in the present disclosure can be understood by those skilled in the art on a case-by-case basis.

The above description are only preferable embodiments of the present disclosure, and thus do not limit the scope of the present disclosure. The equivalent structure made based on the specification and the drawings of the present disclosure, or those directly or indirectly applied to other related technical fields, such as technical fields of camera lens sealing, microscope lens sealing, etc. are all considered to be included in the scope of the present disclosure.

What is claimed is:

1. A lens sealing sleeve comprising:
a hollow cylindrical sleeve body, the sleeve body being used for a lens barrel to pass through and comprising a plurality of fold portions arranged along an axial direction, two ends of the sleeve body being provided with a first opening and a second opening; and
a first connection portion and the second connection portion, the first connection portion comprising a first protrusion and the second connection portion comprising a second protrusion, the first protrusion at least partially surrounding the first opening and correspondingly extending in a direction facing away from a center line of the first opening, the second protrusion at least partially surrounding the second opening and correspondingly extending in a direction facing away from a center line of the second opening, and a first connection hole being disposed on the first protrusion and a second connection hole being disposed on the second protrusion,
wherein the second protrusion comprises a protruding plate integrally surrounding the second opening and is configured to, when in use, be connected to a base body of a lens adjustment module, wherein the lens adjustment module comprises a lens adapter connected to the base body, a recess is provided on a base body surface of the base body facing towards the lens adapter, at least one circle of protruding edge is provided at an edge of a first side surface of the protruding plate facing the sleeve body, and the at least one circle of protruding edge is inserted into and connected to the recess when the second protrusion is connected to the base body.

2. The lens sealing sleeve according to claim 1, wherein the first protrusion comprises a ring tab integrally surrounding the first opening, and a plurality of first connection holes is evenly provided on the ring tab.

3. The lens sealing sleeve according to claim 1, wherein a plurality of second connection holes being provided on the protruding plate, at least one circle of protruding rib being provided on a second side surface of the protruding plate facing away from the sleeve body.

4. The lens sealing sleeve according to claim 3, wherein the protruding rib comprises two circles of first protruding rib provided at an outer edge of the second side surface and a circle of second protruding rib that is closer to the second opening than the first protruding ribs.

5. The lens sealing sleeve according to claim 4, wherein each circle of the first protruding rib comprises a pair of first straight segments opposite to each other and a pair of curved segments that are opposite to each other and distancing away from a center of the second opening in a radial direction of the second opening.

6. The lens sealing sleeve according to claim 5, wherein the second protruding rib comprises a pair of second straight segments that are opposite to each other and respectively parallel to the first straight segments and a pair of head-shoulder segments opposite to each other, a pair of head segments of the pair of head-shoulder segments being close to an outer circumference of the second opening.

7. A lens adjustment module comprising:
a base mechanism and a second adjustment mechanism arranged opposite to each other, the base mechanism comprising a base body, the second adjustment mechanism comprising a second slider, a substantially central region of the base body being provided with a first communication hole and a substantially central region of the second slider being provided with a third communication hole, the second slider being for fixed connection with a lens barrel, the second slider being movable relative to the base body;
a lens sealing sleeve, the lens sealing sleeve comprising a hollow cylindrical sleeve body, a first connection portion and a second connection portion, the sleeve body comprising a plurality of fold portions arranged along an axial direction thereof, a first opening and a second opening being provided at two ends of the sleeve body, the first connection portion comprising a first protrusion and a second connection portion comprising a second protrusion, the first protrusion at least partially surrounding the first opening and correspondingly extending in a direction facing away from a center line of the first opening, the second protrusion at least partially surrounding the second opening and correspondingly extending in a direction facing away from a center line of the second opening, and a first connection hole being disposed on the first protrusion and a second connection hole being disposed on the second protrusion;
a plurality of sleeve connection members, a third connection hole that corresponds to the first connection hole being provided on a side of the second slider facing the base body, a fourth connection hole that corresponds to the second connection hole being provided on a side of the base body facing away from the second slider, the plurality of sleeve connection members connecting the corresponding first and third connection holes so as to connect the first connection portion with the second slider, the plurality of sleeve connection members connecting the corresponding second and fourth connection holes so as to connect the second connection portions with the base body, the third communication hole and the sleeve body passing through the first communication hole being used for passage of the lens barrel; and
a lens adapter connected to the base body,
wherein the second protrusion comprises a protruding plate integrally surrounding the second opening, a recess is provided on a base body surface of the base body facing towards the lens adapter, at least one circle of protruding edge is provided at an edge of a first side surface of the protruding plate facing the sleeve body, and the at least one circle of protruding edge is inserted into and connected to the recess.

8. The lens adjustment module according to claim 7, wherein a first adjustment mechanism is further provided between the base mechanism and the second adjustment mechanism, the base mechanism, the first adjustment mechanism and the second adjustment mechanism being sequentially stacked and connected, the first adjustment mechanism comprising a first slider, a substantially central region of the first slider being provided with a second communication hole, the first slider being movably connected to the base body, the second slider being movably connected the first slider, the sleeve body also passing through the second communication hole, the sleeve body and the third communication hole being used for passage of the lens barrel.

9. The lens adjustment module according to claim 8, wherein the first protrusion comprises a ring tab integrally surrounding the first opening, a plurality of first connection holes being evenly provided on the ring tab, the third connection hole corresponding to the first connection hole being provided on an annular surface on a side of the second slider facing the first slider.

10. The lens adjustment module according to claim 8, wherein, a plurality of second connection holes being provided on the protruding plate, a second side surface of the protruding plate facing away from the sleeve body being provided with at least one circle of protruding rib;
the lens adapter comprising a shelf, a shelf side portion of the shelf facing the base body and abutting against the protruding rib.

11. The lens adjustment module according to claim 10, wherein the lens adapter comprises a receiving cavity that is formed by the shelf and extends in a direction facing away from the base body, the lens barrel being partially received in the receiving cavity, a light transmission portion for a light beam to enter the lens being provided on the receiving cavity, the protruding rib being configured to seal the receiving cavity.

12. The lens adjustment module according to claim 11, wherein the shelf side portion comprises a flange and a racking surface, the flange abutting against the base body surface, the protruding rib comprising two circles of first protruding rib provided at an outer edge of the second side surface and one circle of second protruding rib that is closer to the second opening than the first protruding rib, both the first protruding rib and the second protruding rib abutting against the racking surface.

13. The lens adjustment module according to claim 12, wherein each circle of the first protruding rib comprises a pair of first straight segments opposite to each other and a pair of curved segments that are opposite to each other and distancing away from a center of the second opening in a radial direction of the second opening.

14. A projection apparatus, comprising a lens and a light machine, wherein the projection apparatus further comprises the lens adjustment module according to claim 7, the lens being fixedly connected to the second slider, the lens barrel of the lens passing through the lens sealing sleeve, the lens adapter being connected to the light machine, the lens adapter being provided with a light transmission portion for a light beam generated by the light machine to transmit and enter the lens.

15. The projection apparatus according to claim 14, wherein a first adjustment mechanism is further provided between the base mechanism and the second adjustment mechanism, the base mechanism, the first adjustment mechanism and the second adjustment mechanism being sequentially stacked and connected, the first adjustment mechanism comprising a first slider, a substantially central region of the first slider being provided with a second communication hole, the first slider being movably connected to the base body, the second slider being movably connected the first slider, the sleeve body also passing through the second communication hole, the sleeve body and the third communication hole being used for passage of the lens barrel.

16. The projection apparatus according to claim 15, wherein the first protrusion comprises a ring tab integrally surrounding the first opening, a plurality of first connection holes being evenly provided on the ring tab, the third connection hole corresponding to the first connection hole being provided on an annular surface on a side of the second slider facing the first slider.

17. The projection apparatus according to claim 14, wherein a plurality of second connection holes being provided on the protruding plate, a second side surface of the protruding plate facing away from the sleeve body being provided with at least one circle of protruding rib;
the lens adapter comprising a shelf, a shelf side portion of the shelf facing the base body and abutting against the protruding rib.

18. The projection apparatus according to claim 17, wherein the lens adapter comprises a receiving cavity that is formed by the shelf and extends in a direction facing away from the base body, the lens barrel being partially received in the receiving cavity, a light transmission portion for a light beam to enter the lens being provided on the receiving cavity, the protruding rib being configured to seal the receiving cavity.

19. The lens adjustment module according to claim 13, wherein the second protruding rib comprises a pair of second straight segments that are opposite to each other and respectively parallel to the first straight segments and a pair of head-shoulder segments opposite to each other, a pair of head segments of the pair of head-shoulder segments being close to an outer circumference of the second opening, the second protruding rib being close to a cavity surface of the receiving cavity.

20. The lens adjustment module according to claim 10, wherein the recess is provided on the base body surface of the base body facing towards the shelf.

* * * * *